(12) United States Patent
Roumeliotis et al.

(10) Patent No.: US 9,243,916 B2
(45) Date of Patent: Jan. 26, 2016

(54) OBSERVABILITY-CONSTRAINED VISION-AIDED INERTIAL NAVIGATION

(71) Applicant: Regents of the University of Minnesota, Minneapolis, MN (US)

(72) Inventors: Stergios I. Roumeliotis, Saint Paul, MN (US); Dimitrios G. Kottas, Minneapolis, MN (US); Chao Guo, Minneapolis, MN (US); Joel Hesch, Mountain View, CA (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 14/186,597

(22) Filed: Feb. 21, 2014

(65) Prior Publication Data

US 2014/0316698 A1    Oct. 23, 2014

Related U.S. Application Data

(60) Provisional application No. 61/767,691, filed on Feb. 21, 2013, provisional application No. 61/767,701, filed on Feb. 21, 2013.

(51) Int. Cl.
| | |
|---|---|
| *G06F 7/70* | (2006.01) |
| *G06F 19/00* | (2011.01) |
| *G06G 7/00* | (2006.01) |
| *G06G 7/76* | (2006.01) |
| *G01C 21/16* | (2006.01) |

(52) U.S. Cl.
CPC .................. *G01C 21/165* (2013.01)

(58) Field of Classification Search
CPC ............................. G01C 21/00; G01C 21/165
USPC .......................................................... 701/500
See application file for complete search history.

(56) References Cited

U.S. PATENT DOCUMENTS

| | | | |
|---|---|---|---|
| 5,847,755 A | 12/1998 | Wixson et al. | |
| 7,991,576 B2 | 8/2011 | Roumeliotis | |
| 8,577,539 B1 * | 11/2013 | Morrison et al. | 701/28 |
| 2002/0198632 A1 | 12/2002 | Breed et al. | |
| 2004/0073360 A1 | 4/2004 | Foxlin | |
| 2004/0167667 A1 | 8/2004 | Goncalves et al. | |
| 2008/0167814 A1 | 7/2008 | Samarasekera et al. | |
| 2008/0279421 A1 | 11/2008 | Hamza et al. | |
| 2009/0248304 A1 | 10/2009 | Roumeliotis et al. | |
| 2010/0110187 A1 | 5/2010 | von Flotow et al. | |

(Continued)

FOREIGN PATENT DOCUMENTS

WO    2015013418 A2    1/2015

OTHER PUBLICATIONS

Ayache et al., "Maintaining Representations of the Environment of a Mobile Robot," IEEE Trans. Robot. Autom., vol. 5(6), Dec. 1989, pp. 804-819.

(Continued)

*Primary Examiner* — Maceeh Anwari
(74) *Attorney, Agent, or Firm* — Shumaker & Sieffert, P.A.

(57) ABSTRACT

This disclosure describes techniques for reducing or eliminating estimator inconsistency in vision-aided inertial navigation systems (VINS). For example, an observability-constrained VINS (OC-VINS) is described which enforce the unobservable directions of the system to prevent spurious information gain and reduce inconsistency.

22 Claims, 15 Drawing Sheets

(56) References Cited

U.S. PATENT DOCUMENTS

2012/0194517 A1 8/2012 Izadi et al.
2014/0333741 A1 11/2014 Roumeliotis et al.

OTHER PUBLICATIONS

Bartoli et al., "Structure from Motion Using Lines: Respresentation, Triangulation and Bundle Adjustment," Computer Vision and Image Understanding, vol. 100(3), Dec. 2005, pp. 416-441.
Canny, "A Computational Approach to Edge Detection," IEEE Trans. Patt. Analy. Machine Intell., vol. 8(6), Nov. 1986, pp. 679-698.
Chen, "Pose Determination from Line-to-Plane Correspondences: Existence Condition and Closed-Form Solutions," Proc. 3rd. Int. Conf. Comp. Vision, Dec. 4-7, 1990, pp. 374-378.
Erdogan et al., "Planar Segmentation of RGBD Images Using Fast Linear Fitting and Markov Chain Monte Carlo," Proceedings of the IEEE International Conference on Computer and Robot Vision, May 27-30, 2012, pp. 32-39.
Guo et al., "IMU-RGBD Camera 3d Pose Estimation and Extrinsic Calibration: Observability Analysis and Consistency Improvement," Proceedings of the IEEE International Conference on Robotics and Automation, May 6-10, 2013, pp. 2935-2942.
Guo et al., "Observability-constrained EKF Implementation of the IMU-RGBD Camera Navigation Using Point and Plane Features," Technical Report. University of Minnesota, Mar. 2013, 6 pp.
Hermann et al., "Nonlinear Controllability and Observability," IEEE Trans. On Automatic Control, vol. 22(5), Oct. 1977, pp. 728-740.
Herrera et al., "Joint Depth and Color Camera Calibration with Distortion Correction," IEEE Trans. On Pattern Analysis and Machine Intelligence, vol. 34(10), Oct. 2012, pp. 2058-2064.
Hesch et al., "Observablity-constrained vision-aided Inertial Navigation," University of Minnesota, Department of Computer Science and Engineering, MARS Lab, Feb. 2012, 24 pp.
Hesch et al., "Towards Consistent Vision-aided Inertial Navigation," Proceedings of the 10th International Workshop on the Algorithmic Foundations of Robotics, Jun. 13-15, 2012, 16 pp.
Huang et al., "Visual Odometry and Mapping for Autonomous Flight Using an RGB-D Camera," Proceedings of the International Symposium on Robotics Research, Aug. 28,-Sep. 1, 2011, 16 pp.
Jones et al., "Visual-inertial Navigation, Mapping and Localization: A Scalable Real-time Causal Approach," Int. J. Robot. Res., vol. 30(4), Apr. 2011, pp. 407-430.
Kottas et al., "On the Consistency of Vision-aided Inertial Navigation," Proceedings of the Int. Symp. Exper. Robot., Jun. 17-21, 2012, 15 pp.
Li et al., "Improving the Accuracy of EKF-based Visual-inertial Odometry," Proceedings of the IEEE International Conference on Robotics and Automation, May 14-18, 2012, pp. 828-835.
Liu et al., "Estimation of Rigid Body Motion Using Straight Line Correspondences," Computer Vision, Graphics, and Image Processing, vol. 43(1), Jul. 1988, pp. 37-52.
Lupton et al., "Visual-inertial-aided Navigation for High-dynamic Motion in Built Environments Without Initial Conditions," IEEE Trans. Robot., vol. 28(1), Feb. 2012, pp. 61-76.
Martinelli, "Vision and Imu Data Fusion: Closed-form Solutions for Attitude, Speed, Absolute Scale, and Bias Determination," IEEE Trans. Robot, vol. 28(1), Feb. 2012, pp. 44-60.
Matas et al., "Robust Detection of Lines Using the Progressive Probabilistic Hough Transformation," Computer Vision and Image Understanding, vol. 78(1), Apr. 2000, pp. 119-137.
Meltzer et al., "Edge Descriptors for Robust Wide-baseline Correspondence," Proc. IEEE Conf. Comp. Vision Patt. Recog., Jun. 23-28, 2008, pp. 1-8.
Mirzaei et al., "A Kalman Filter-based Algorithm for IMU-Camera Calibration: Observability Analysis and Performance Evaluation," IEEE Trans. Robot., vol. 24(5), Oct. 2008, pp. 1143-1156.
Mirzaei et al., "Optimal Estimation of Vanishing Points in a Manhattan World," IEEE Int. Conf. Comp. vision, Nov. 6-13, 2011, pp. 2454-2461.
Mourikis et al., "A Multi-state Constraint Kalman Filter for Vision-aided Inertial Navigation," Proceedings of the IEEE International Conference on Robotics and Automation, Apr. 10-14, 2007, pp. 3482-3489.
Mourikis et al., "Vision-aided Inertial Navigation for Spacecraft Entry, Descent, and Landing," IEEE Trans. Robot., vol. 25(2), Apr. 2009, pp. 264-280.
Roumeliotis et al., "Stochastic Cloning: A Generalized Framework for Processing Relative State Measurements," Proc. IEEE Int. Conf. Robot. Autom., May 11-15, 2002, pp. 1788-1795.
Schmid et al., "Automatic Line Matching Across Views," Proc. of the IEEE Conf. on Computer Vision and Pattern Recognition, Jun. 1997, pp. 666-671.
Servant et al., "Improving Monocular Plane-based SLAM with Inertial Measurements," Proceedings of the IEEE/RSJ International Conference on Intelligent Robots and Systems, Oct. 18-22, 2010, pp. 3810-3815.
Smith et al., "Real-time Monocular Slam with Straight Lines," British Machine vision Conference, vol. 1, Sep. 2006, pp. 17-26.
Spetsakis et al., "Structure from Motion Using Line Correspondences," Int. Journal Computer Vision, vol. 4(3), Jun. 1990, pp. 171-183.
Taylor et al., "Structure and Motion from Line Segments in Multiple Images," IEEE Trans. Pail. Analy. Machine Intell., vol. 17(11), Nov. 1995, pp. 1021-1032.
Trawny et al., "Indirect Kalman Filter for 3D Attitude Estimation," University of Minnesota, Dept. of Comp. Sci. & Eng., MARS Lab, Mar. 2005, 25 pp.
Weiss et al., "Real-time Metric State Estimation for Modular Vision-inertial Systems," Proceedings of the IEEE International Conference on Robotics and Automation, May 9-13, 2011, pp. 4531-4537.
Weiss et al., "Real-time Onboard Visual-inertial State Estimation and Self-calibration of MAVs in Unknown Environment," Proceedings of the IEEE International Conference on Robotics and Automation, May 14-18, 2012, pp.
Weiss et al., "Versatile Distributed Pose Estimation and sensor Self-Calibration for an Autonomous MAV," Proceedings of IEEE International Conference on Robotics and Automations, May 14-18, 2012, pp. 31-38.
Weng et al., "Motion and Structure from Line Correspondences: Closed-form Solution, Uniqueness, and Optimization," IEEE Transactions on Pattern Analysis and Machine Intelligence, vol. 14(3), Mar. 1992, pp. 318-336.
Williams et al., "Feature and Pose Constrained Visual Aided Inertial Navigation for Computationally Constrained Aerial Vehicles," Proceedings of the International Conference on Robotics and Automation, May 9-13, 2011, pp. 431-438.
Zhou et al., "Determining 3d Relative Transformations for any Combiniation of Range and Bearing Measurements," IEEE Trans. On Robotics, vol. 29(2), Apr. 2013, pp. 458-474.
Mirzaei et al., "Globally Optimal Pose Estimation from Line Correspondences," Proc. IEEE Int. Conf. Robot., May 9-13, 2011, pp. 5581-5588.
U.S. Provisional U.S. Appl. No. 61/767,701 by Stergios I. Roumeliotis, filed Feb. 21, 2013.
U.S. Provisional U.S. Appl. No. 61/023,569 by Stergios I. Roumeliotis, filed Jul. 11, 2014.
U.S. Provisional U.S. Appl. No. 61/014,532 by Stergios I. Roumeliotis, filed Jun. 19, 2014.
Dellaert et al., "Square Root SAM: Simultaneous Localization and Mapping via Square Root Information Smoothing," International Journal of Robotics and Research, vol. 25(12), Dec. 2006, pp. 1181-1203.
Eustice et al., "Exactly Sparse Delayed-state Filters for View-based SLAM," IEEE Transactions on Robotics, vol. 22 (6), Dec. 2006, pp. 1100-1114.
Johannsson et al., "Temporally Scalable Visual Slam Using a Reduced Pose Graph," in Proceedings of the IEEE International Conference on Robotics and Automation, May 6-10, 2013, 8 pp.
Kaess et al., "iSAM: Incremental Smoothing and Mapping," IEEE Transactions on Robotics, Manuscript, Sep. 2008, 14 pp.

(56) References Cited

OTHER PUBLICATIONS

Kaess et al., "iSAM2: Incremental Smoothing and Mapping Using the Bayes Tree," International Journal of Robotics Research, vol. 21, Feb. 2012, pp. 217-236.

Klein et al., "Parallel Tracking and Mapping for Small AR Workspaces," in Proceedings of the IEEE and ACM International Symposium on Mixed and Augmented Reality, Nov. 13-16, 2007, pp. 225-234.

Konolige et al., "Efficient Sparse Pose Adjustment for 2D Mapping," in Proceedings of the IEEE/RSJ International Conference on Intelligent Robots and Systems, Oct. 18-22, 2010, pp. 22-29.

Konolige et al., "FrameSLAM: From Bundle Adjustment to Real-time Visual Mapping," IEEE Transactions on Robotics, vol. 24(5), Oct. 2008, pp. 1066-1077.

Konolige et al., "View-based Maps," International Journal of Robotics Research, vol. 29(29), Jul. 2010, 14 pp.

Kummerle et al., "g2o: A General Framework for Graph Optimization," in Proceedings of the IEEE International Conference on Robotics and Automation, May 9-13, 2011, pp. 3607-3613.

Sibley et al., "Sliding Window Filter with Application to Planetary Landing," Journal of Field Robotics, vol. 27(5), Sep./Oct. 2010, pp. 587-608.

Smith et al., "On the Representation and Estimation of Spatial Uncertainty," International Journal of Robotics Research, vol. 5(4), 1986, pp. 56-68 (Note: Applicant points out in accordance with MPEP 609.04(a) that the 1986 year of publication is sufficiently earlier than the effective U.S. filing date and any foreign priority date of Feb. 21, 2014 so that the particular month of publication.

\* cited by examiner

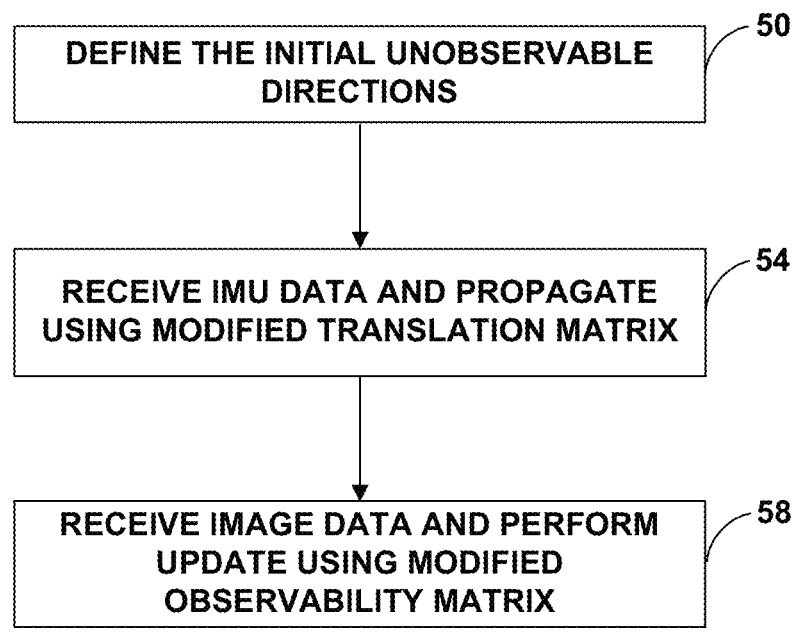
FIG. 1.1

OBSERVABILITY-CONSTRAINED VISION-AIDED INERTIAL NAVIGATION

This application claims the benefit of U.S. Provisional Patent Application No. 61/767,691, filed Feb. 21, 2013 and U.S. Provisional Patent Application No. 61/767,701, filed Feb. 21, 2013, the entire content of each being incorporated herein by reference.

TECHNICAL FIELD

This disclosure relates to navigation and, more particularly, to vision-aided inertial navigation.

BACKGROUND

In general, a Vision-aided Inertial Navigation System (VINS) fuses data from a camera and an Inertial Measurement Unit (IMU) to track the six-degrees-of-freedom (d.o.f.) position and orientation (pose) of a sensing platform. In this way, the VINS combines complementary sensing capabilities. For example, an IMU can accurately track dynamic motions over short time durations, while visual data can be used to estimate the pose displacement (up to scale) between consecutive views. For several reasons, VINS has gained popularity to address GPS-denied navigation.

SUMMARY

In general, this disclosure describes techniques for reducing or eliminating estimator inconsistency in vision-aided inertial navigation systems (VINS). It is recognized herein that a significant cause of inconsistency can be gain of spurious information along unobservable directions, resulting in smaller uncertainties, larger estimation errors, and divergence. An Observability-Constrained VINS (OC-VINS) is described herein, which may enforce the unobservable directions of the system, thereby preventing one or more unobservable directions from erroneously being treated as observable after estimation, thereby preventing spurious information gain and reducing inconsistency.

As used herein, an unobservable direction refers to a direction along which perturbations of the state cannot be detected from the input data provided by the sensors of the VINS. That is, an unobservable direction refers to a direction along which changes to the state of the VINS relative to one or more feature may be undetectable from the input data received from at least some of the sensors of the sensing platform. As one example, a rotation of the sensing system around a gravity vector may be undetectable from the input of a camera of the sensing system when feature rotation is coincident with the rotation of the sensing system. Similarly, translation of the sensing system may be undetectable when observed features are identically translated.

In addition, this disclosure presents a linear-complexity 3D inertial navigation algorithm that computes state estimates based on a variety of captured features, such as points, lines, planes or geometric shapes based on combinations thereof, such as crosses (i.e., perpendicular, intersecting line segments), sets of parallel line segments, and the like.

As one example, the algorithm is applied using both point and plane features observed from an input source, such as an RGBD camera. The navigational system's observability properties are described and it is proved that: (i) when observing a single plane feature of known direction, the IMU gyroscope bias is observable, and (ii) by observing at least a single point feature, as well as a single plane of known direction but not perpendicular to gravity, all degrees of freedom of the IMU-RGBD navigation system become observable, up to global translations. Next, based on the results of the observability analysis, a consistency-improved, observability-constrained (OC) extended Kalman filter (EKF)-based estimator for the IMU-RGBD camera navigation system is described. Finally, the superiority of the described algorithm is experimentally validated in comparison to alternative methods using urban scenes.

The techniques described herein are applicable to several variants of VINS, such as Visual Simultaneous Localization and Mapping (V-SLAM) as well as visual-inertial odometry using the Multi-state Constraint Kalman Filter (MSC-KF), or an inverse filter operating on a subset of or all image and IMU data. The proposed techniques for reducing inconsistency are extensively validated with simulation trials and real-world experimentation.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 1.1 is a flowchart illustrating an example operation of estimator applying the techniques described here.

FIG. 2($c$) illustrate camera-IMU trajectory and 3D features. FIG. ($f$) illustrates error and $3\sigma$ bounds for the rotation about the gravity vector, plotted for the first 100 sec of a representative run.

FIG. 4($b$) is a perspective diagram illustrating an AscTech Pelican on which the camera-IMU package was mounted during the indoor experiments.

FIG. 5($a$) is a plot illustrating projection on the x and y axis. FIG. 5($b$) is a plot illustrating projection on the y and z axis. FIG. 5($c$) is a plot illustrating 3D view of the overall trajectory and the estimated features.

FIG. 9(a) illustrates an outdoor experimental trajectory covering 1.5 km across the University of Minnesota campus. The red (blue) line denotes the OC-MSC-KF (Std-MSC-KF) estimated trajectory. The green circles denote a low-quality GPS-based estimate of the position across the trajectory. FIG. 9(b) illustrates a zoom-in view of the beginning/end of the run. Both filters start with the same initial pose estimate, however, the error for the Std-MSC-KF at the end of the run is 10:97 m, while for the OC-MSC-KF the final error is 4:38 m (an improvement of approx. 60%). Furthermore, the final error for the OC-MSC-KF is approximately 0:3% of the distance traveled. FIG. 9(c) illustrates a zoomed-in view of the turn-around point. The Std-MSC-KF trajectory is shifted compared to the OC-MSC-KF, which remains on the path (light-brown region).

FIG. 10(a) illustrates position uncertainty along the x-axis (perpendicular to the direction of motion) for the Std-MSC-KF, and OC-MSC-KF respectively. FIG. 10(b) illustrates orientation uncertainty about the vertical axis (z).

DETAILED DESCRIPTION

Figure 1:
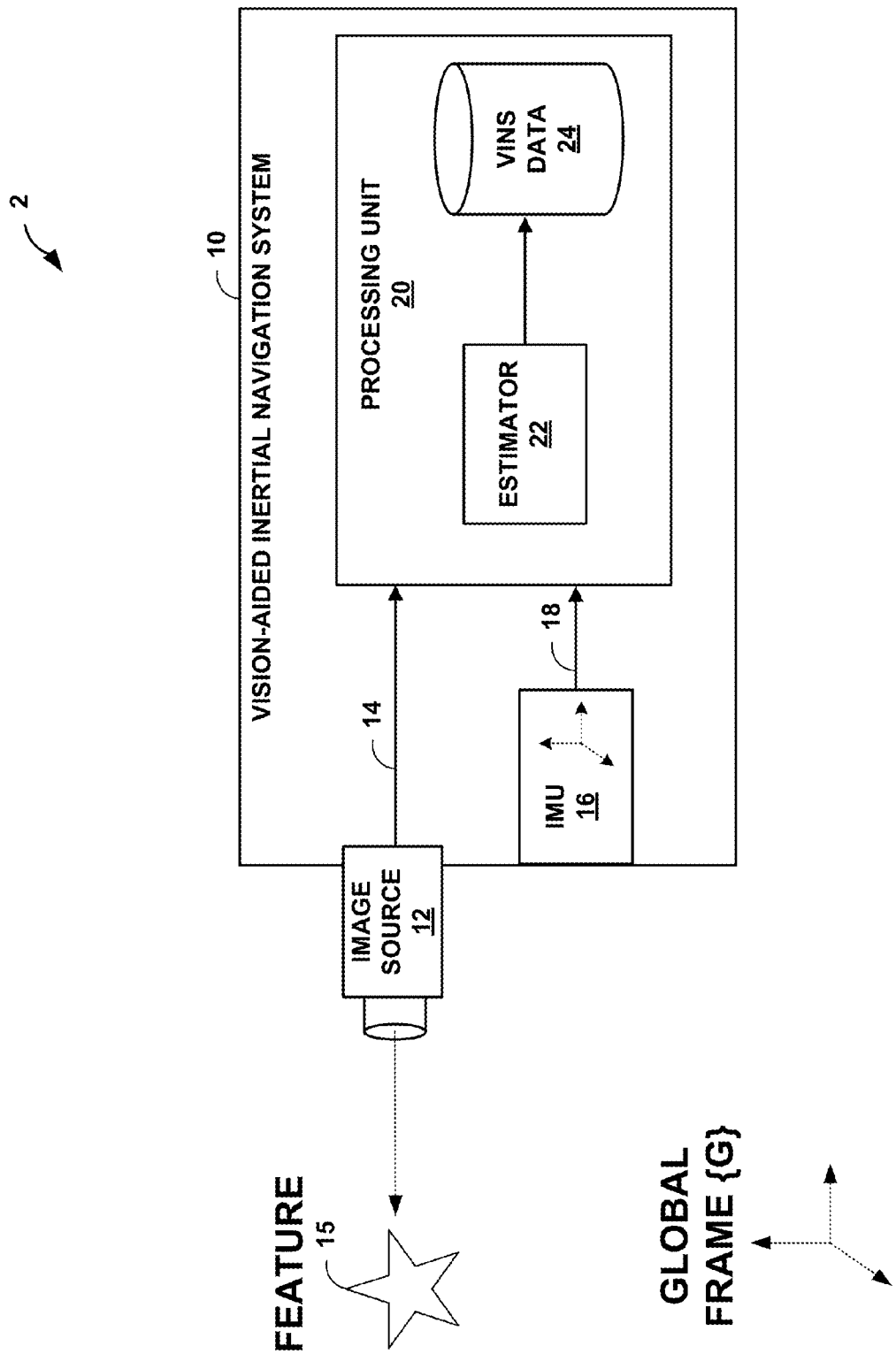
FIG. 1 is a block diagram illustrating a sensor platform comprising an IMU and a camera.

Estimator inconsistency can greatly affect vision-aided inertial navigation systems (VINS). As generally defined in, a state estimator is "consistent" if the estimation errors are zero-mean and have covariance smaller than or equal to the one calculated by the filter. Estimator inconsistency can have a devastating effect, particularly in navigation applications, since both the current pose estimate and its uncertainty, must be accurate in order to address tasks that depend on the localization solution, such as path planning. For nonlinear systems, several potential sources of inconsistency exist (e.g., motion-model mismatch in target tracking), and great care must be taken when designing an estimator to improve consistency.

Techniques for estimation are described that reduces or prohibits estimator inconsistency. For example, the estimation techniques may eliminate inconsistency due to spurious information gain which arises from approximations incurred when applying linear estimation tools to nonlinear problems (i.e., when using linearized estimators such as the extended Kalman Filter (EKF)).

For example, the structure of the "true" and estimated systems are described below and it is shown that for the true system four unobservable directions exist (i.e., 3-d.o.f. global translation and 1-d.o.f. rotation about the gravity vector), while the system employed for estimation purposes has only three unobservable directions (3-d.o.f. global translation). Further, it is recognized herein that a significant source of inconsistency in VINS is spurious information gained when orientation information from the image data and the IMU data is incorrectly projected along the direction corresponding to rotations about the gravity vector. An elegant and powerful estimator modification is described that reduces or explicitly prohibits this incorrect information gain. An estimator may, in accordance with the techniques described herein, apply a constrained estimation algorithm that computes the state estimates based on the IMU data and the image data while preventing projection of information from the image data and IMU data along at least one of the unobservable degrees of freedom. The techniques described herein may be applied in a variety of VINS domains (e.g., V-SLAM and the MSC-KF) when linearized estimators, such as the EKF, are used.

As used herein, an unobservable direction refers to a direction along which perturbations of the state cannot be detected from the input data provided by the sensors of the VINS. That is, an unobservable direction refers to a direction along which changes to the state of the VINS relative to one or more feature may be undetectable from the input data received from at least some of the sensors of the sensing platform. As one example, a rotation of the sensing system around a gravity vector may be undetectable from the input of a camera of the sensing system when feature rotation is coincident with the rotation of the sensing system. Similarly, translation of the sensing system may be undetectable when observed features are identically translated.

In one example, the observability properties of a linearized VINS model (i.e., the one whose Jacobians are evaluated at the true states) are described, and it is shown that such a model has four unobservable d.o.f., corresponding to three-d.o.f. global translations and one-d.o.f. global rotation about the gravity vector. Moreover, it is shown that when the estimated states are used for evaluating the Jacobians, as is the case for the EKF, the number of unobservable directions is reduced by one. In particular, the global rotation about the gravity vector becomes (erroneously) observable, allowing the estimator to gain spurious information and leading to inconsistency. These results confirm the findings of using a different approach (i.e., the observability matrix), while additionally specifying the exact mathematical structure of the unobservable directions necessary for assessing the EKF's inconsistency.

To address these problems, modifications of the VINS EKF is described herein where, in one example, estimated Jacobians are updated so as to ensure that the number of unobservable directions is the same as when using the true Jacobians. In this manner, the global rotation about the gravity vector remains unobservable and the consistency of the VINS EKF is significantly improved.

Simulations and experimental results are described that demonstrate inconsistency in standard VINS approaches as well as validate the techniques described herein to show that the techniques improve consistency and reduce estimation errors as compared to conventional VINS. In addition, performance of the described techniques is illustrated experimentally using a miniature IMU and a small-size camera.

This disclosure describes example systems and measurement models, followed by analysis of VINS inconsistency. The proposed estimator modification are presented and subsequently validated both in simulations and experimentally.

VINS Estimator Description

An overview of the propagation and measurement models which govern the VINS is described. In one example, an EKF is employed for fusing the camera and IMU measurements to estimate the state of the system including the pose, velocity, and IMU biases, as well as the 3D positions of visual landmarks observed by the camera. One example utilizes two types of visual features in a VINS framework. The first are opportunistic features (OFs) that can be accurately and efficiently tracked across short image sequences (e.g., using KLT), but are not visually distinctive enough to be efficiently recognized when revisiting an area. OFs can be efficiently used to estimate the motion of the camera over short time horizons (i.e., using the MSC-KF), but they are not included in the state vector. The second are Persistent Features (PFs), which are typically much fewer in number, and can be reliably redetected when revisiting an area (e.g., SIFT keys). 3D coordinates of the PFs (e.g., identified points, lines, planes, or geometric shapes based on combinations thereof) are estimated and may be recorded, e.g., into a database, to construct a map of the area or environment in which the VINS is operating.

System State and Propagation Model

FIG. 1 is a block diagram illustrating a vision-aided inertial navigation system (VINS) 10 comprises an image source 12 and an inertial measurement unit (IMU) 14. Image source images an environment in which VINS 10 operates so as to produce image data 14. That is, image source 12 provides image data 14 that captures a number of features visible in the environment. Image source 12 may be, for example, one or more cameras that capture 2D or 3D images, a laser scanner or other optical device that produces a stream of 1D image data, a depth sensor that produces image data indicative of ranges for features within the environment, a stereo vision system having multiple cameras to produce 3D information, and the like.

IMU 16 produces IMU data 18 indicative of a dynamic motion of VINS 10. IMU 14 may, for example, detect a current rate of acceleration using one or more accelerometers as VINS 10 is translated, and detect changes in rotational attributes like pitch, roll and yaw using one or more gyroscopes. IMU 14 produces IMU data 18 to specify the detected motion. Estimator 22 of processing unit 20 process image data 14 and IMU data 18 to compute state estimates for the degrees of freedom of VINS 10 and, from the state estimates, computes position, orientation, speed, locations of observable features, a localized map, an odometry or other higher order derivative information represented by VINS data 24.

In this example, $\{I_{\bar{q}G}, G_{PI}\}$ are the quaternion of orientation and position vector describing the pose of the sensing IMU frame $\{I\}$ with respect to the global frame $\{G\}$. The i-th feature's 3D coordinates are denoted as $G_{f_i}$, and $I_{f_i}$, with respect to $\{I\}$ and $\{G\}$, respectively.

In one example, estimator 22 comprises an EKF that estimates the 3D IMU pose and linear velocity together with the time-varying IMU biases and a map of visual features 15. In one example, the filter state is the $(16+3N) \times 1$ vector:

$$x = \begin{bmatrix} I - T \\ q \ G \end{bmatrix} b_g^T \ GV_I^T \ b_a^T \ GP_I^T \mid Gf_1^T \ \ldots \ Gf_N^T \end{bmatrix}^T \quad (1)$$

$$= [X_S^T \mid X_f^T]^T$$

where $x_s(t)$ is the 16×1 state of VINS 10, and $x_f(t)$ is the 3N×1 state of the feature map. The first component of the state of VINS 10 is $^I q_G(t)$ which is the unit quaternion representing the orientation of the global frame $\{G\}$ in the IMU frame, $\{I\}$, at time t. The frame $\{I\}$ is attached to the IMU, while $\{G\}$ is a local-vertical reference frame whose origin coincides with the initial IMU position. The state of VINS 10 also includes the position and velocity of $\{I\}$ in $\{G\}$, denoted by the 3×1 vectors $^G p_I(t)$ and $^G v_I(t)$, respectively. The remaining components are the biases, $b_g(t)$ and $b_a(t)$, affecting the gyroscope and accelerometer measurements, which are modeled as random-walk processes driven by the zero-mean, white Gaussian noise $n_{wg}(t)$ and $n_{wa}(t)$, respectively.

In one example, the map state, $x_f$, comprises the 3D coordinates of N PFs, $^G f_i$, i=1, ..., N, and grows as new PFs are observed. In one implementation, the VINS does not store OFs in the map. Instead, processing unit 20 of VINS 10 processes and marginalizes all OFs in real-time using the MSC-KF approach. An example continuous-time model which governs the state of VINS 10.

An example system model describing the time evolution of the state and applied by estimator 22 is represented as:

$$^I \dot{q}_G(t) = \frac{1}{2} \Omega(\omega(t))^I q_G(t) \quad (2)$$

$$^G \dot{p}_I(t) = {}^G v_I(t) \quad (3)$$

$$^G \dot{v}_I(t) = {}^G a(t) \quad (4)$$

$$\dot{b}_g(t) = n_{wg}(t) \quad (5)$$

$$\dot{b}_a(t) = n_{wa}(t) \quad (6)$$

$$^G \dot{f}_i(t) = 0_{3\times 1}, i=1, \ldots, N. \quad (7)$$

In these expressions, $\omega(t)=[\omega(t) \ \omega_2(t) \ \omega(t)]^T$ is the rotational velocity of the IMU, expressed in $\{I\}$, $^G a$ is the IMU acceleration expressed in $\{G\}$, and $$\Omega(\omega) = \begin{bmatrix} -\lfloor \omega X \rfloor & \omega \\ -\omega^T & 0 \end{bmatrix},$$

$$\lfloor \omega X \rfloor \triangleq \begin{bmatrix} 0 & -\omega_3 & \omega_2 \\ \omega_3 & 0 & -\omega_1 \\ -\omega_2 & \omega_1 & 0 \end{bmatrix}.$$

The gyroscope and accelerometer measurements, $\omega_m$ and $a_m$, are modeled as $$\omega_m(t)=\omega(t)+b_g(t)+n_g(t)$$

$$a_m(t)=C(^I q_G(t))(^G a(t)-{}^G g)+b_a(t)+n_a(t),$$

where $n_g$ and $n_a$ are zero-mean, white Gaussian noise processes, and $^G g$ is the gravitational acceleration. The matrix $C$ ( q) is the rotation matrix corresponding to q. The PFs belong to the static scene, thus, their time derivatives are zero.

Linearizing at the current estimates and applying the expectation operator on both sides of (2)-(7), the state estimate propagation model is obtained as:

$$^I \dot{\hat{q}}_G(t) = \frac{1}{2} \Omega(\hat{\omega}(t))^I \hat{q}_G(t) \quad (10)$$

$$^G \dot{\hat{p}}_I(t) = {}^G \hat{v}_I(t) \quad (11)$$

$$^G \dot{\hat{v}}_I(t) = C^T(^I \hat{q}_G(t)) \hat{a}(t) + {}^G g \quad (12)$$

$$\dot{\hat{b}}_g(t) = 0_{3\times 1} \quad (13)$$

$$\dot{\hat{b}}_a(t) = 0_{3\times 1} \quad (14)$$

$$^G \dot{\hat{f}}_i(t) = 0_{3\times 1}, i=1, \ldots, N, \quad (15)$$

where $\hat{a}(t)=a_m(t)-\hat{b}_a(t)$, and $\hat{\omega}(t)=\omega_m(t)-\hat{b}_g(t)$.

The (15+3N)×1 error-state vector is defined as $$\tilde{x} = \begin{bmatrix} I\delta\theta_G^T & \tilde{b}_g^T & G\tilde{v}_I^T & \tilde{b}_a^T & G\tilde{p}_I^T & | & G\tilde{f}_1^T & \ldots & G\tilde{f}_N^T \end{bmatrix}^T \quad (16)$$
$$= [\tilde{x}_S^T | \tilde{x}_f^T]^T,$$

where $x_s(t)$ is the 15×1 error state corresponding to the sensing platform, and $x_f(t)$ is the 3N×1 error state of the map. For the IMU position, velocity, biases, and the map, an additive error model is utilized (i.e., $x = \hat{x} - \tilde{x}$ is the error in the estimate $\hat{x}$ of a quantity x). However, for the quaternion a multiplicative error model is employed. Specifically, the error between the quaternion q and its estimate $\hat{q}$ is the 3×1 angle-error vector, $\delta\Theta$, implicitly defined by the error quaternion:

$$\delta\bar{q} \equiv \bar{q} \otimes \hat{\bar{q}}^{-1} \simeq \begin{bmatrix} \frac{1}{2}\delta\theta^T & 1 \end{bmatrix}^T, \quad (17)$$

where $\delta\bar{q}$ describes the small rotation that causes the true and estimated attitude to coincide. This allows the attitude uncertainty to be represented by the 3×3 covariance matrix $E[\delta\Theta \delta\Theta^T]$, which is a minimal representation.

The linearized continuous-time error-state equation is $$\dot{\tilde{x}} = \begin{bmatrix} F_s & 0_{15\times 3N} \\ 0_{3N\times 15} & 0_{3N} \end{bmatrix}\tilde{x} + \begin{bmatrix} G_s \\ 0_{3N\times 12} \end{bmatrix}n \quad (18)$$
$$= F\tilde{x} + Gn,$$

where $0_{3N}$ denotes the 3N×3N matrix of zeros. Here, n is the vector comprising the IMU measurement noise terms as well as the process noise driving the IMU biases, i.e., $$n = [n_g^T \ n_{wg}^T \ n_a^T \ n_{wa}^T]^T, \quad (19)$$

while $F_s$ is the continuous-time error-state transition matrix corresponding to the state of VINS 10, and $G_s$ is the continuous-time input noise matrix, i.e., $$F_s = \begin{bmatrix} -\lfloor\hat{\omega}\times\rfloor & -I_3 & 0_3 & 0_3 & 0_3 \\ 0_3 & 0_3 & 0_3 & 0_3 & 0_3 \\ -C^T(I\hat{\bar{q}}G)\lfloor\hat{a}\times\rfloor & 0_3 & 0_3 & -C^T(I\hat{\bar{q}}G) & 0_3 \\ 0_3 & 0_3 & 0_3 & 0_3 & 0_3 \\ 0_3 & 0_3 & I_3 & 0_3 & 0_3 \end{bmatrix} \quad (20)$$

$$G_s = \begin{bmatrix} -I_3 & 0_3 & 0_3 & 0_3 \\ 0_3 & I_3 & 0_3 & 0_3 \\ 0_3 & 0_3 & C^T(I\hat{\bar{q}}G) & 0_3 \\ 0_3 & 0_3 & 0_3 & I_3 \\ 0_3 & 0_3 & 0_3 & 0_3 \end{bmatrix} \quad (21)$$

where $I_3$ is the 3×3 identity matrix. The system noise is modeled as a zero-mean white Gaussian process with autocorrelation $E[n(t)n^T(\tau)]=Q_c\delta(t-\tau)$, where $Q_c$ depends on the IMU noise characteristics and is computed off-line.

Discrete-Time Implementation

The IMU signals $\omega_m$ and $a_m$ are sampled by processing unit 20 at a constant rate $1/\delta t$, where $\delta t \triangleq t_{k+1} - t_k$. Upon receiving a new IMU measurement 18, the state estimate is propagated by estimator 22 using 4th-order Runge-Kutta numerical integration of (10)-(15). In order to derive the covariance propagation equation, the discrete-time state transition matrix, $\Phi_k$ is computed, and the discrete-time system noise covariance matrix, $Q_k$ is computed as $$\Phi_k = \Phi(t_{k+1}, t_k) \quad (22)$$
$$= \exp\left(\int_{t_k}^{t_{k+1}} F(\tau)d\tau\right)$$

$$Q_k = \int_{t_k}^{t_{k+1}} \Phi(t_{k+1}, \tau) G Q_c G^T \Phi^T(t_{k+1}, \tau) d\tau.$$

The covariance is then propagated as:

$$P_{k+1|k} = \Phi_k P_{k|k} \Phi_k^T + Q_k. \quad (23)$$

In the above expression, and throughout this disclosure, $P_{i|j}$ and $\hat{x}_{i|j}$ are used to denote the estimates of the error-state covariance and state, respectively, at time-step i computed using measurements up to time-step j.

Measurement Update Model

As VINS 10 moves, image source observes both opportunistic and persistent visual features. These measurements are utilized to concurrently estimate the motion of the sensing platform (VINS 10) and the map of PFs. In one implementation, three types of filter updates are distinguished: (i) PF updates of features already in the map, (ii) initialization of PFs not yet in the map, and (iii) OF updates. The feature measurement model is described how the model can be employed in each case.

To simplify the discussion, the observation of a single PF point $f_i$ is considered. The image source measures $z_i$, which is the perspective projection of the 3D point ${}^If_i$, expressed in the current IMU frame {I}, onto the image plane, i.e., $$z_i = \frac{1}{z}\begin{bmatrix} x \\ y \end{bmatrix} + \eta_i \quad (24)$$

where $$\begin{bmatrix} x \\ y \\ z \end{bmatrix} = If_i \quad (25)$$
$$= C(I\bar{q}_G)(Gf - Gp_{I_i}).$$

Without loss of generality, the image measurement is expressed in normalized pixel coordinates, and the camera frame is considered to be coincident with the IMU. Both intrinsic and extrinsic IMU-camera calibration can be performed off-line.

The measurement noise, $\eta_i$, is modeled as zero mean, white Gaussian with covariance $R_i$. The linearized error model is:

$$\tilde{z}_i = z_i - \hat{z}_i \simeq H_i \tilde{x} + \eta_i \quad (26)$$

where $\hat{z}$ is the expected measurement computed by evaluating (25) at the current state estimate, and the measurement Jacobian, $H_i$, is $$H_i = H_c[H_{\bar{q}} \ 0_{3\times 9} \ H_p | 0_3 \ldots H_{f_i} \ldots 0_3] \quad (27)$$

with $$H_c = \frac{1}{z^2}\begin{bmatrix} z & 0 & -x \\ 0 & z & -y \end{bmatrix} \quad (28)$$

$$H_q = \lfloor C(I_{\bar{q}G})(G_{f_i} - G_{P_i}) \times \rfloor \quad (29)$$

$$H_p = -C(I_{\bar{q}G}) \quad (30)$$

$$H_{f_i} = C(I_{\bar{q}G}). \quad (31)$$

evaluated at the current state estimate. Here, $H_c$, is the Jacobian of the camera's perspective projection with respect to $^I f_i$, while $H_{\bar{q}}$, $H_p$, and $H_{f_i}$ are the Jacobians of $^I f_i$ with respect to $I_{\bar{q}G}$, $^G p_I$, and $^G f_i$.

This measurement model is utilized in each of the three update methods. For PFs that are already in the map, the measurement model (25)-(27) is directly applied to update the filter. In particular, the measurement residual $r_i$ is computed along with its covariance $S_i$, and the Kalman gain $K_i$, i.e., $$r_i = z_i - \hat{z}_i \quad (32)$$

$$S_i = H_i P_{k+1|k} H_i^T + R_i \quad (33)$$

$$K_i = P_{k+1|k} H_i^T S_i^{-1}. \quad (34)$$

and update the EKF state and covariance as $$\hat{x}_{k+1|k+1} = \hat{x}_{k+1|k} + K_i r_i \quad (35)$$

$$P_{k+1|k+1} = P_{k+1|k} - P_{k+1|k} H_i^T S_i^{-1} H_i P_{k+1|k} \quad (36)$$

For previously unseen (new) PFs, compute an initial estimate is computed, along with covariance and cross-correlations by solving a bundle-adjustment problem over a short time window. Finally, for OFs, the MSC-KF is employed to impose an efficient (linear complexity) pose update constraining all the views from which a set of features was seen.

VINS Observability Analysis

In this section, the observability properties of the linearized VINS model are examined. Specifically, the four unobservable directions of the ideal linearized VINS are analytically determined (i.e., the system whose Jacobians are evaluated at the true states). Subsequently, the linearized VINS used by the EKF, whose Jacobians are evaluated using the current state estimates, are shown to have only three unobservable directions (i.e., the ones corresponding to global translation), while the one corresponding to global rotation about the gravity vector becomes (erroneously) observable. The findings of this analysis are then employed to improve the consistency of the EKF-based VINS.

Observability Analysis of the Ideal Linearized VINS Model

An observability matrix is defined as a function of the linearized measurement model, H, and the discrete-time state transition matrix, $\Phi$, which are in turn functions of the linearization point, $x^*$, i.e., $$M(x^*) = \begin{bmatrix} H_1 \\ H_2 \Phi_{2,1} \\ \vdots \\ H_k \Phi_{k,1} \end{bmatrix} \quad (37)$$

where $\Phi_{k,1} = \Phi_{k+1} \ldots \Phi_1$ is the state transition matrix from time step 1 to k. First, consider the case where the true state values are used as linearization point $x^*$ for evaluating the system and measurement Jacobians. The case where only a single feature point is visible is discussed. The case of multiple features can be easily captured by appropriately augmenting the corresponding matrices. Also, the derived nullspace directions remain the same, in terms of the number, with an identity matrix $(-\lfloor ^G f_i \times \rfloor^G g)$ appended to the ones corresponding to global translation (rotation) for each new feature. The first block-row of M is written as (for k=-1):

$$H_k = \psi_1 [\psi_2 \; 0_3 \; 0_3 \; 0_3 \; -I_3 \; I_3] \quad (38)$$

where $$\Psi_1 = H_{c,k} C(^{I_k} q_G) \quad (39)$$

$$\Psi_2 = \lfloor ^G f - ^G p_{I_k} \times \rfloor C(^{I_k} q_G)^T \quad (40)$$

and $^{I_k} q_G$, denotes the rotation of $\{G\}$ with respect to frame $\{I_k\}$ at time step k=-1.

To compute the remaining block rows of the observability matrix, $\Phi_{k,1}$ is determined analytically by solving the matrix differential equation:

$$\dot{\Phi}_{k,1} = F \Phi_{k,1}, \text{ i.c. } \Phi_{1,1} = I_{18}. \quad (41)$$

with F detailed in (18). The solution has the following structure $$\Phi_{k,1} = \begin{bmatrix} \Phi_{11} & \Phi_{12} & 0_3 & 0_3 & 0_3 & 0_3 \\ 0_3 & I_3 & 0_3 & 0_3 & 0_3 & 0_3 \\ \Phi_{31} & \Phi_{32} & I_3 & \Phi_{34} & 0_3 & 0_3 \\ 0_3 & 0_3 & 0_3 & I_3 & 0_3 & 0_3 \\ \Phi_{51} & \Phi_{52} & \delta t(k-1)I_3 & \Phi_{54} & I_3 & 0_3 \\ 0_3 & 0_3 & 0_3 & 0_3 & 0_3 & I_3 \end{bmatrix} \quad (42)$$

where among the different block elements $\Phi_{ij}$, the ones necessary in the analysis are listed below:

$$\Phi_{11} = C(^{I_k} q_{I_1}) \quad (43)$$

$$\Phi_{31} = -\lfloor (^G v_{I_k} - ^G v_{I_1}) + ^G g(k-1)\delta t \times \rfloor C(^G q_{I_1}) \quad (44)$$

$$\Phi_{51} = \left\lfloor ^G p_{I_1} + ^G v_{I_1}(k-1)\delta t - \frac{1}{2} ^G g((k-1)\delta t)^2 - ^G p_{I_k} \times \right\rfloor C(^G q_{I_1}) \quad (45)$$

By multiplying (38) at time-step k and (42), the k-th block row of M is obtained, for k>1:

$$M_k = H_k \Phi_{k,1} \quad (46)$$
$$= \Gamma_1 [\; \Gamma_2 \; \Gamma_3 \; -\delta t(k-1)I_3 \; \Gamma_4 \; -I_3 \; I_3 \;]$$

where $$\Gamma_1 = H_{c,k} C(^{I_k} q_G) \quad (47)$$

$$\Gamma_2 = \left\lfloor ^G f - ^G p_{I_1} - ^G v_{I_1}(k-1)\delta t + \frac{1}{2} ^G g((k-1)\delta t)^2 \times \right\rfloor \cdot C(^{I_1} q_G)^T \quad (48)$$

$$\Gamma_3 = \lfloor ^G f - ^G p_{I_k} \times \rfloor C^T (^{I_k} q_G) \Phi_{12} - \Phi_{52} \quad (49)$$

$$\Gamma_4 = -\Phi_{54} \quad (50)$$

One primary result of the analysis is: the right nullspace $N_1$ of the observability matrix $M(x)$ of the linearized VINS $$M(x)N_1 = 0 \quad (51)$$

spans the following four directions:

$$N_1 = \begin{bmatrix} 0_3 & C(I_{1\bar{q}G}) & G_g \\ 0_3 & & 0_3 \\ 0_3 & -\lfloor G_{V_{I_1}} \times \rfloor & G_g \\ & 0_3 & 0_3 \\ I_3 & -\lfloor G_{P_{I_1}} \times \rfloor & G_g \\ I_3 & -\lfloor G_f \times \rfloor & G_g \end{bmatrix} \quad (52)$$

$$= [N_{t,1} \mid N_{r,1}]$$

For example, the fact that $N_1$ is indeed the right nullspace of $M(x)$ can be verified by multiplying each block row of M [see (46)] with $N_{t,1}$ and $N_{r,1}$ in (52). Since $M_k N_{t,1}=0$ and $M_k N_{r,1}=0$, it follows that $MN_1=0$. The 18×3 block column $N_{t,1}$ corresponds to global translations, i.e., translating both the sensing platform and the landmark by the same amount. The 18×1 column $N_{r,1}$ corresponds to global rotations of the sensing platform and the landmark about the gravity vector.

Observability Analysis of the EKF Linearized VINS Model

Ideally, any VINS estimator should employ a linearized system with an unobservable subspace that matches the true unobservable directions (52), both in number and structure. However, when linearizing about the estimated state ˆx, M=M ('x) gains rank due to errors in the state estimates across time. In particular, the last two block columns of $M_k$ in (46) remain the same when computing $M_k=H_k\Phi_{k,1}$ from the Jacobians $H_k$ and $\Phi_{k,1}$ evaluated at the current state estimates and thus the global translation remains unobservable. In contrast, the rest of the block elements of (46), and specifically $\Gamma_2$ do not adhere to the structure shown in (48) and as a result the rank of the observability matrix $\hat{M}$ corresponding to the EKF linearized VINS model increases by one. In particular, it can be easily verified that the right nullspace $\hat{N}_1$ of $\hat{M}$ does not contain the direction corresponding to the global rotation about the g vector, which becomes (erroneously) observable. This, in turn, causes the EKF estimator to become inconsistent. The following describes techniques for addressing this issue.

OC-VINS: Algorithm Description

FIG. 1.1 is a flowchart illustrating an example operation of estimator 22 applying the techniques described here. Although illustrated for purposes of example as sequential, the steps of the flowchart may be performed concurrently. Initially, estimator 22 defines the initial unobservable directions, e.g., computes an initial nullspace from (eq. 55) for the particular system (STEP 50). In one example, the unobservable degrees of freedom comprise translations in horizontal and vertical directions and a rotation about a gravity vector. In another example, such as with respect to use of line features, other degrees of freedom may be unobservable.

Estimator 22 receives IMU data 18 and, based on the IMU data 18, performs propagation by computing updated state estimates and propagating the covariance. At this time, estimator 22 utilizes a modified a state transition matrix to prevent correction of the state estimates along at least one of the unobservable degrees of freedom (STEP 54). In addition, estimator 22 receives image data 14 and updates the state estimates and covariance based on the image data. At this time, estimator 22 uses a modified observability matrix to similarly prevent correction of the state estimates along at least one of the unobservable degrees of freedom (STEP 58). In this example implementation, estimator 22 enforces the unobservable directions of the system, thereby preventing one or more unobservable directions from erroneously being treated as observable after estimation, thereby preventing spurious information gain and reducing inconsistency. In this way, processing unit 20 may more accurately compute state information for VINS 10, such as a pose of the vision-aided inertial navigation system, a velocity of the vision-aided inertial navigation system, a displacement of the vision-aided inertial navigation system based at least in part on the state estimates for the subset of the unobservable degrees of freedom without utilizing state estimates the at least one of the unobservable degrees of freedom.

An example algorithm is set forth below for implementing the techniques in reference to the equations described in further detail herein:

```
Initialization: Initialization: Compute initial nullspace from (55)
while running do
    Propagation:
        Integrate state equations
        Compute nullspace at current time-step from (56)
        Compute Φ_k from (22)
        Modify Φ_k using (60) - (62)
        Propagate covariance
    Update:
    for all observed features do
        Compute measurement Jacobian from (27)
        Modify H using (69)-(74)
        Apply filter updated
    end for
    New landmark initialization:
    for all new PFs observed do
        Initialize G_f̂ᵢ
        Create nullspace block, N_fᵢ, for G_f̂ᵢ
        Augment N_k with the new sub-block N_fᵢ
    end for
end while
```

In order to address the EKF VINS inconsistency problem, it is ensured that (51) is satisfied for every block row of $\hat{M}$ when the state estimates are used for computing $\hat{H}_k$, and $\hat{\Phi}_{k,1}$, $\forall k>0$, i.e., it is ensured that $$\hat{H}_k \hat{\Phi}_{k,1} \hat{N}_1 = 0, \forall k>0. \quad (53)$$

One way to enforce this is by requiring that at each time step, $\hat{\Phi}_k$ and $\hat{H}_k$ satisfy the following constraints:

$$\hat{N}_{k+1} = \hat{\Phi}_k \hat{N}_k \quad (54a)$$

$$\hat{H}_k \hat{N}_k = 0, \forall k>0 \quad (54b)$$

where $\hat{N}_k$, k>0 is computed analytically (see (56)). This can be accomplished by appropriately modifying $\hat{\Phi}_k$ and $\hat{H}_k$.

In particular, rather than changing the linearization points explicitly, the nullspace, $\hat{N}_k$, is maintained at each time step, and used to enforce the unobservable directions. This has the benefit of allowing us to linearize with the most accurate state estimates, hence reducing the linearization error, while still explicitly adhering to the system observability properties.

Nullspace Initialization

The initial nullspace is analytically defined:

$$\hat{N}_1 = \begin{bmatrix} 0_3 & C(I_{\bar{q}_{G,0|0}}) & G_g \\ 0_3 & 0_3 & \\ 0_3 & -\lfloor G_{\hat{v}_{I,0|0}} \times \rfloor & G_g \\ & 0_3 & 0_3 \\ I_3 & -\lfloor G_{\hat{p}_{I,0|0}} \times \rfloor & G_g \\ I_3 & -\lfloor G_{\hat{f}_{I,0|0}} \times \rfloor & G_g \end{bmatrix} \quad (55)$$

At subsequent time steps, the nullspace is augmented to include sub-blocks corresponding to each new PF in the filter state, i.e., $$\hat{N}_k = \begin{bmatrix} 0_3 & C({}^{I}\hat{q}_{G,k|k-1})^G g \\ 0_3 & 0_3 \\ 0_3 & -\lfloor {}^G\hat{v}_{I,k|k-1} \times \rfloor {}^G g \\ 0_3 & 0_3 \\ I_3 & -\lfloor {}^G\hat{p}_{I,k|k-1} \times \rfloor {}^G g \\ I_3 & -\lfloor {}^G\hat{f}_{I,k|k-\ell} \times \rfloor {}^G g \\ \vdots & \vdots \\ I_3 & -\lfloor {}^G\hat{f}_{N,k|k-\ell'} \times \rfloor {}^G g \end{bmatrix}. \quad (56)$$

where the sub-blocks $\hat{N}_{F_i} = [I_3 - \lfloor G_{\hat{f}_{k|k-i}} \times \rfloor G_g]$, are the rows corresponding to the i-th feature in the map, which are a function of the feature estimate at the time-step when it was initialized (k−1).

Modification of the State Transition Matrix $\Phi$

During the covariance propagation step, it is ensured that $\hat{N}_{k+1} = \hat{\Phi}_k \hat{N}_k$. Note, the constraint on $\hat{N}_{t,k}$ is automatically satisfied due to the structure of $\hat{\Phi}_k$, so we focus on $\hat{N}_{r,k}$. Note that due to the structure of the matrices $\Phi_k$ and $N_{r,k}$, the first five block elements of need only be considered while the equality for the remaining ones, i.e., the elements corresponding to the features, are automatically satisfied. Specifically, rewrite (54a) is rewritten element-wise as:

$$\hat{N}_{r,k+1} = \quad (57)$$

$$\hat{\Phi}_k \hat{N}_{r,k} \Rightarrow \begin{bmatrix} C(I_{\bar{q}_{G,k+1|k}}) G_g \\ -\lfloor G_{\hat{v}_{I,k+1|k}} \times \rfloor G_g \\ -\lfloor G_{\hat{p}_{I,k+1|k}} \times \rfloor G_g \end{bmatrix} = \begin{bmatrix} \Phi_{11} & \Phi_{12} & 0_3 & 0_3 & 0_3 \\ 0_3 & I_3 & 0_3 & 0_3 & 0_3 \\ \hat{\Phi}_{31} & \hat{\Phi}_{32} & I_3 & \hat{\Phi}_{34} & 0_3 \\ 0_3 & 0_3 & 0_3 & I_3 & 0_3 \\ \hat{\Phi}_{51} & \hat{\Phi}_{52} & \delta t I_3 & \hat{\Phi}_{54} & I_3 \end{bmatrix}.$$

$$\begin{bmatrix} C(I_{\bar{q}_{G,k|k-1}}) G_g \\ -\lfloor G_{\hat{v}_{I,k|k-1}} \times \rfloor G_g \\ -\lfloor G_{\hat{p}_{I,k|k-1}} \times \rfloor G_g \end{bmatrix} \quad (58)$$

and collect the constraints resulting from each block row of the above vector. Specifically, from the first block row we have $$C(I_{\bar{q}_{G,k+1|k}}) G_g = \hat{\Phi}_{11} C(I_{\bar{q}_{G,k|k-1}}) G_g \quad (59)$$

$$\Rightarrow \hat{\Phi}_{11}^* = C(I, k+1 | k_{\bar{q}_{I,k|k-1}}) \quad (60)$$

The requirements for the third and fifth block rows are $$\hat{\Phi}_{31} C(I_{\bar{q}_{G,k|k-1}}) G_g = \lfloor G_{\hat{v}_{I,k|k-1}} - G_{\hat{v}_{I,k+1|k}} \times \rfloor G_g \quad (61)$$

$$\hat{\Phi}_{51} C(I_{\bar{q}_{G,k|k-1}}) G_g = \lfloor \delta t {}^G \hat{v}_{I,k|k-1} - G_{\hat{p}_{I,k+1|k}} \times \rfloor G_g \quad (62)$$

both of which are in the form Au=w, where u and w are nullspace vector elements that are fixed. In order to ensure that (61) and (62) are satisfied, a perturbed A* is found for A=$\Phi_{31}$ and A=$\Phi_{51}$ that fulfills the constraint. To compute the minimum perturbation, A*, of A, the following minimization problem is formulated:

$$\min_{A^*} \|A^* - A\|_\mathcal{F}^2, \quad (63)$$
$$\text{s.t.} \quad A^* u = w$$

where $\|\cdot\|_\mathcal{F}$ denotes the Frobenius matrix norm. After employing the method of Lagrange multipliers, and solving the corresponding KKT optimality conditions, the optimal A* that fulfills (63) is $$A^* = A - (Au - w)(u^T u)^{-1} u^T. \quad (64)$$

Once the modified $\hat{\Phi}_{11}^*$, is computed from (60), and $\hat{\Phi}_{13}^*$ and $\hat{\Phi}_{51}^*$ from (63) and (64), the corresponding elements of $\hat{\Phi}_k$ is updated and the covariance propagation is addressed.

Modification of H

During each update step, we seek to satisfy $\hat{H}_k \hat{N}_k = 0$. In turn, this means that $$\hat{H}_k \hat{N}_{t,k} = 0 \quad (65)$$

$$\hat{H}_k \hat{N}_{r,k} = 0 \quad (66)$$

must both hold. Expressing (65) for a single point we have [see (27) and (52)]

$$\hat{H}_c [\hat{H}_q \quad 0_{3\times 9} \quad \hat{H}_P | \hat{H}_f] \begin{bmatrix} 0_3 \\ 0_3 \\ 0_3 \\ 0_3 \\ 0_3 \\ I_3 \\ I_3 \end{bmatrix} = 0 \quad (67)$$

which is satisfied automatically, since $\hat{H}_P = -\hat{H}_f$ [see (30) and (31)]. Hence, the nullspace direction corresponding to translation is not violated.

Expanding the second constraint (66), we have $$\hat{H}_c [\hat{H}_q \quad 0_{3\times 9} \quad \hat{H}_P | \hat{H}_f] \begin{bmatrix} C({}^I \hat{q}_{G,k|k-1})^G g \\ 0_3 \\ -\lfloor {}^G \hat{v}_{I,k|k-1} \times \rfloor {}^G g \\ 0_3 \\ -\lfloor {}^G \hat{p}_{I,k|k-1} \times \rfloor {}^G g \\ -\lfloor {}^G \hat{f}_{k|k-\ell} \times \rfloor {}^G g \end{bmatrix} = 0 \quad (68)$$

Since $\hat{H}_P = -\hat{H}_f$, (68) is equivalent to satisfying the following relationship $$\left[\hat{H}_c\hat{H}_{\bar{q}} \quad \hat{H}_c\hat{H}_p\right]\begin{bmatrix} C({}^I\hat{\bar{q}}_{G,k|k-1}){}^Gg \\ \left[{}^G\hat{f}_{k|k-\ell} - {}^G\hat{p}_{I,k|k-1}\times\right]{}^Gg \end{bmatrix} = 0 \quad (69)$$

$$\left[\hat{H}_{c\bar{q}} \quad \hat{H}_{cp}\right]\begin{bmatrix} C({}^I\hat{\bar{q}}_{G,k|k-1}){}^Gg \\ \left[{}^G\hat{f}_{k|k-\ell} - {}^G\hat{p}_{I,k|k-1}\times\right]{}^Gg \end{bmatrix} = 0$$

where we have implicitly defined $\hat{H}_{c\bar{q}}$ and $\hat{H}_{cP}$ as elements of the Jacobian. This is a constraint of the form Au=0, where u is a function of the nullspace elements, and hence is fixed, while A comprises block elements of the measurement Jacobian. We compute the optimal A* that satisfies (69) using (63) and (64). By direct application of (63), for $$A = \left[\hat{H}_{c\bar{q}} \quad \hat{H}_{cp}\right] \quad (70)$$

$$u = \begin{bmatrix} C({}^I\hat{\bar{q}}_{G,k|k-1}){}^Gg \\ \left[{}^G\hat{f}_{k|k-\ell} - {}^G\hat{p}_{I,k|k-1}\times\right]{}^Gg \end{bmatrix}$$

$$w = 0$$

A* is computed as:

$$A^* = A - Au(u^Tu)^{-1}u^T \quad (71)$$

After computing the optimal A*, the Jacobian elements are recovered as $$\hat{H}_{c\bar{q}}^* = A^*_{1:2,1:3} \quad (72)$$

$$\hat{H}_{cp}^* = A^*_{1:2,4:6} \quad (73)$$

$$\hat{H}_{cf}^* = -\hat{H}_{cp}^* \quad (74)$$

where the subscripts (i:j, m:n) denote the submatrix spanning rows i to j, and columns m to n. Hence the modified observability matrix is $$\hat{H}_k^* = [\hat{H}_{c\bar{q}}^* \; 0_{2\times9} \; \hat{H}_{cP}^* \; \hat{H}_{cf}^*] \quad (75)$$

Having computed the modified measurement Jacobian, the filter update is performed. By following this process, it can be ensured that the EKF estimator 22 does not gain information along the unobservable directions of the system. An overview of one example of the OC-VINS modified EKF estimator is presented in Algorithm 1.

As the camera-IMU platform (VINS 10) moves into new environments, new features are added to the map constructed within VINS 24. This entails intersecting the bearing measurements from multiple camera observations to obtain an initial estimate of each new feature's 3D location, as well as computing the initial covariance and cross-correlation between the new landmark estimate and the state. This can be solved as a minimization problem over a parameter vector $x = [x_{s,1}^t \ldots x_{s,m}^T | f^T]^T$, where $x_{s,i}$, i=1 ... m, are the m camera poses which the new landmark, f, was observed from. Specifically, the following is minimized:

$$C(x) = \frac{1}{2}\left\{(x-\hat{x})^T\begin{bmatrix} P_{ss}^{-1} & 0 \\ 0 & 0 \end{bmatrix}(x-\hat{x}) + \sum_i(z_i - h(x))^TR_i^{-1}(z_i - h(x))\right\}, \quad (76)$$

where $P_{ss}^{-1}$ is the information matrix (prior) of the state estimates across all poses obtained from the filter, and we have no initial information about the feature location (denoted by the block (2,2) element of the prior information being equal to zero). The m measurements $z_i$, i=1 ... m are the perspective projection observations of the point. Stochastic cloning over m time steps are employed to ensure that the cross-correlation between the camera poses are properly accounted for.

An initial guess for the landmark location is obtained using any intersection method, and then (76) is iteratively minimized. At each iteration, the following linear system of equations is solved:

$$\begin{bmatrix} P_{ss}^{-1} + H_s^TR^{-1}H_s & H_s^TR^{-1}H_f \\ H_f^TR^{-1}H_s & H_f^TR^{-1}H_f \end{bmatrix}\begin{bmatrix} \tilde{x}_s \\ \tilde{x}_f \end{bmatrix} = \begin{bmatrix} H_s^TR^{-1} \\ H_f^TR^{-1} \end{bmatrix}\tilde{z} \leftrightarrow \begin{bmatrix} A & U \\ V & C \end{bmatrix}\tilde{x} \quad (77)$$

$$= \begin{bmatrix} P \\ Q \end{bmatrix}\tilde{z}$$

Applying the Sherman-Morrison-Woodbury matrix identity, we solve the system by inverting the matrix on the left-hand side as $$\begin{bmatrix} A & U \\ V & C \end{bmatrix}^{-1} = \begin{bmatrix} \gamma_1 & \gamma_2 \\ \gamma_3 & \gamma_4 \end{bmatrix} \quad (78)$$

where $$\gamma_1 = (A - UC^{-1}V)^{-1} \quad (79)$$
$$= P_{ss} - P_{ss}H_s^T \cdot \{M^{-1} - M^{-1}H_f(H_f^TM^{-1}H_f)^{-1}H_f^TM^{-1}\}H_sP_{ss}$$

$$\gamma_2 = \gamma_3^T \quad (80)$$
$$= -(A - UC^{-1}V)^{-1}UC^{-1}$$
$$= -P_{ss}H_s^TM^{-1}H_f(H_f^TM^{-1}H_f)^{-1}$$

$$\gamma_4 = C^{-1}V(A - UC^{-1}V)^{-1}UC^{-1} + C^{-1} \quad (81)$$
$$= (H_f^TM^{-1}H_f)^{-1}.$$

Here, $M = H_sP_{ss}H_s^T + R$. During each iteration, the parameter vector is updated as $$x^{\oplus} = x^{\ominus} + \begin{bmatrix} A & U \\ V & C \end{bmatrix}^{-1}\begin{bmatrix} P \\ Q \end{bmatrix}\tilde{z} \quad (82)$$

After the minimization process converges, the posterior covariance of the new state (including the initialized feature) is computed as:

$$P^{\oplus} = \begin{bmatrix} A & U \\ V & C \end{bmatrix}^{-1}, \quad (83)$$

where each element is defined from (79)-(80).

Simulations

Monte-Carlo simulations were conducted to evaluate the impact of the proposed Observability-Constrained VINS (OC-VINS) method on estimator consistency. The proposed methodology was applied to two VINS systems: (i) Visual Simultaneous Localization and Mapping (V-SLAM), and (ii) the Multi-state Constraint Kalman Filter (MSC-KF), which performs visual-inertial localization without constructing a map.

Simulation 1: Application of the Proposed Framework to V-SLAM

Figure 2A:
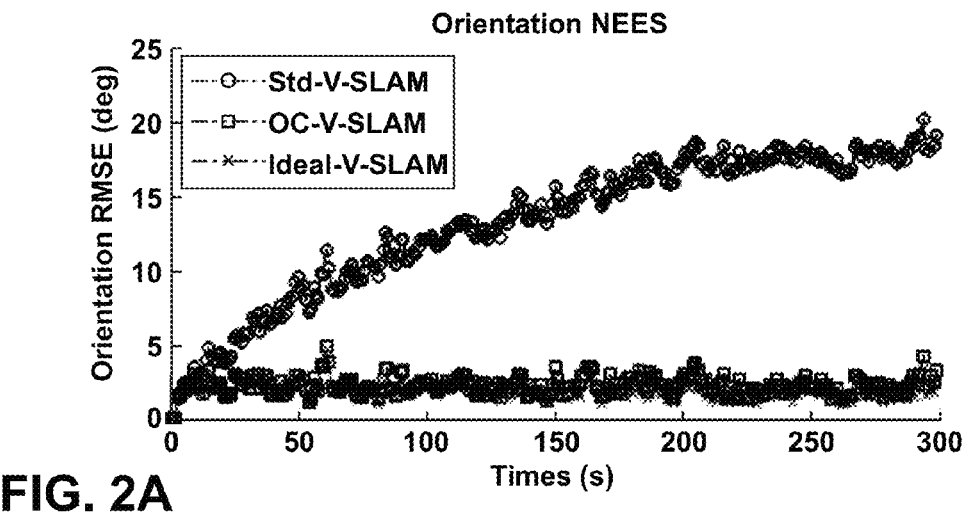
FIGS. 2($a$)-2($f$) are plots associated with a first example simulation. In this example, the RMSE and NEES errors for orientation (a)-(b) and position (d)-(e) are plotted for all three filters, averaged per time step over 20 Monte Carlo trials.
Figure 2B:
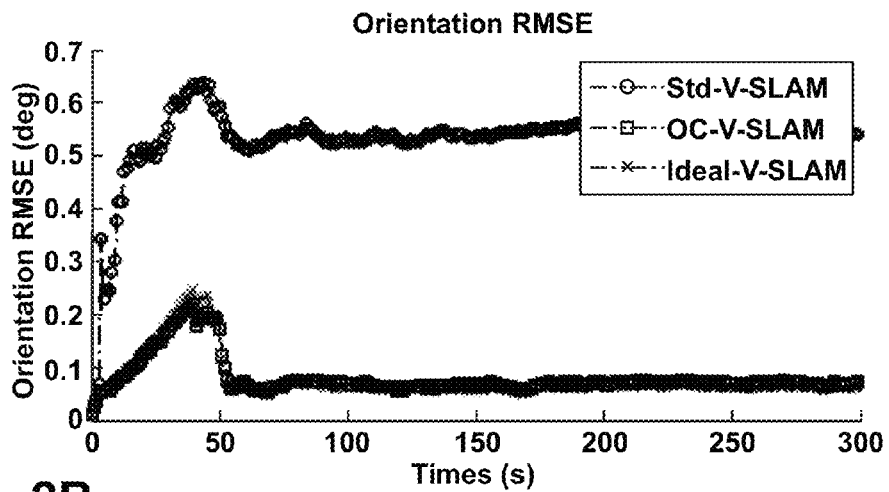
Figure 2C:
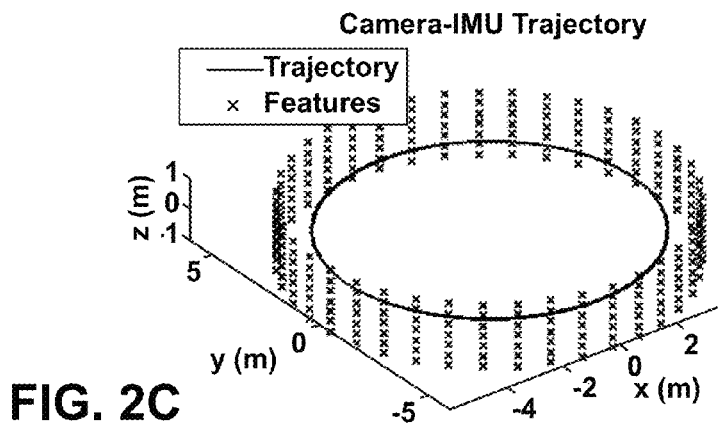
Figure 2D:
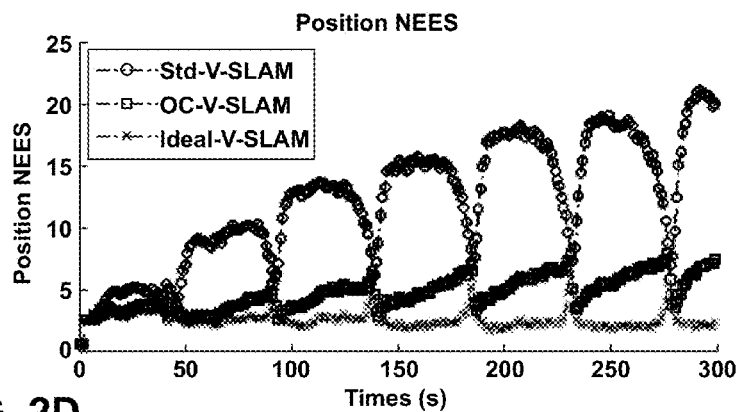
Figure 2E:
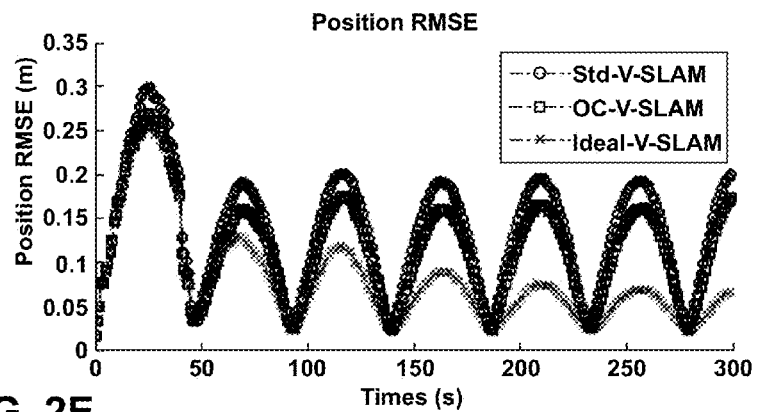
Figure 2F:
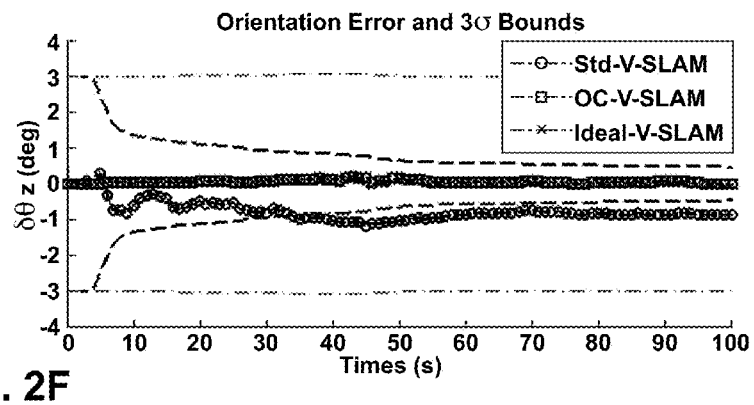
Figure 3A:
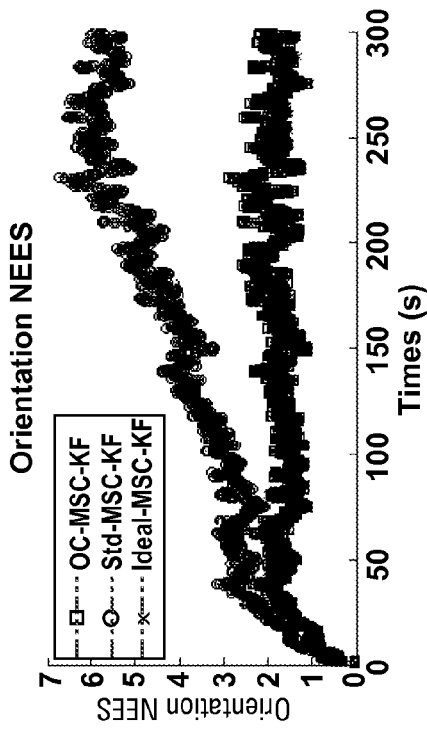
FIGS. 3($a$)-3($d$) illustrate a set of plots associated with Simulation 2 including the average RMSE and NEES over 30 Monte-Carlo simulation trials for orientation (above) and position (below). Note that the OC-MSC-KF attained performance almost indistinguishable to the Ideal-MSC-KF.
Figure 3B:
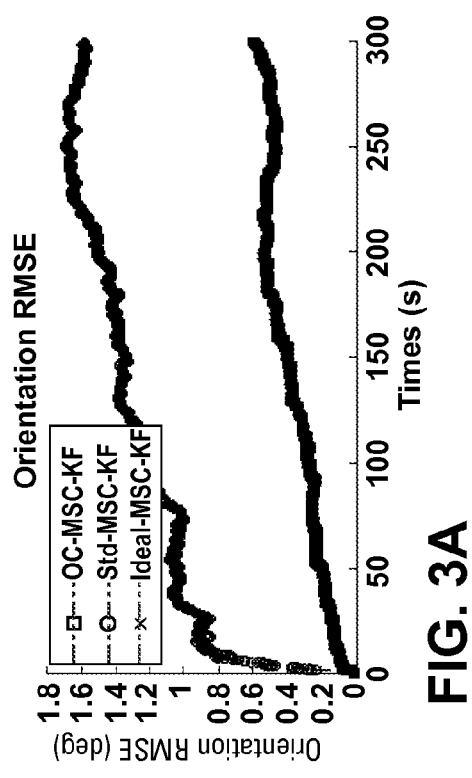
Figure 3C:
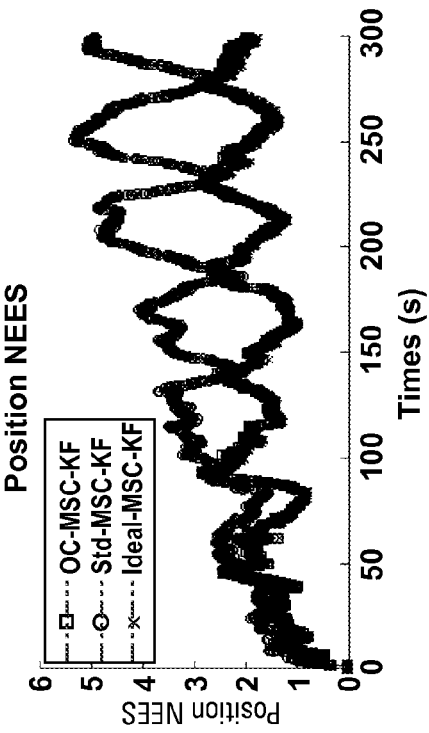
Figure 3D:
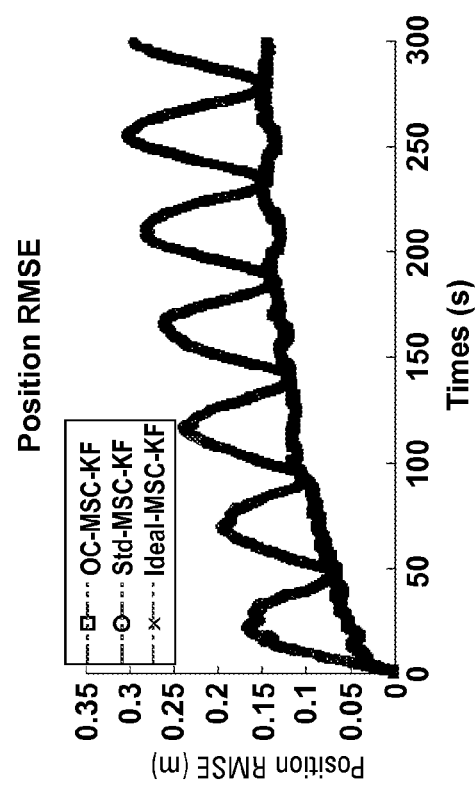

In this section, the results of applying the proposed OC-VINS techniques to V-SLAM (referred to as OC-V-SLAM) are described. The Visual Simultaneous Localization and Mapping (V-SLAM) paradigm refers to a family of algorithms for fusing inertial measurements with visual feature observations. In V-SLAM, the current IMU pose, as well as the 3D positions of all visual landmarks are jointly estimated. The performance of OC-SLAM described herein is compared to the standard V-SLAM (Std-V-SLAM), as well as the ideal V-SLAM that linearizes about the true state. Specifically, the Root Mean Squared Error (RMSE) and Normalized Estimation Error Squared (NEES) were computed over 20 trials in which the camera-IMU platform traversed a circular trajectory of radius 5 m at an average velocity of 60 cm/s. The camera had 45 deg field of view, with $\sigma_{px}=1$px, while the IMU was modeled after MEMS quality sensors. The camera observed visual features distributed on the interior wall of a circumscribing cylinder with radius 6 m and height 2 m (see FIG. 2C). The effect of inconsistency during a single run is depicted in FIG. 2f. The error and corresponding 3σ bounds of uncertainty are plotted for the rotation about the gravity vector. It is clear that the Std-V-SLAM gains spurious information, hence reducing its 3σ bounds of uncertainty, while the Ideal-V-SLAM and the OC-V-SLAM do not. The Std-V-SLAM becomes inconsistent on this run as the orientation errors fall outside of the uncertainty bounds, while both the Ideal-V-SLAM and the OC-V-SLAM remain consistent. FIG. 2 also displays the RMSE and NEES plots, in which it is observed that the OC-V-SLAM attains orientation accuracy and consistency levels similar to the Ideal-V-SLAM, while significantly outperforming the Std-V-SLAM. Similarly, the OC-V-SLAM obtains better positioning accuracy compared to the Std-V-SLAM.

Simulation 2: Application of the Proposed Framework to MSC-KF

The OC-VINS methodology described herein was applied to the MSC-KF (referred herein as "OC-MSC-KF"). In the MSC-KF framework, all the measurements to a given OF are incorporated during a single update step of the filter, after which each OF is marginalized. Hence, in the OC-MSC-KF, the sub-blocks of the nullspace corresponding to the features [i.e., $N_{f_i}$, i=1, ..., N, see (56)] are not maintained. Instead, only the portion of the nullspace corresponding to the state of VINS 10 is propagated forward, and the feature nullspace block for each feature is formed only when it is processed in an update.

Monte-Carlo simulations were conducted to evaluate the consistency of the proposed method applied to the MSC-KF. Specifically, the standard MSC-KF (Std-MSC-KF) was compared with the Observability-Constrained MSC-KF (OC-MSC-KF), which is obtained by applying the methodology described herein, as well as the Ideal-MSC-KF, whose Jacobians are linearized at the true states, which were used as a benchmark. The RMSE and NEES were evaluated over 30 trials (see FIGS. 3(a)-3(d)) in which the camera-IMU platform traversed a circular trajectory of radius 5 m at an average speed of 60 cm/s, and 50 randomly distributed features per image were observed. As evident, the OC-MSC-KF outperforms the Std-MSC-KF and attains performance almost indistinguishable from the Ideal-MSC-KF in terms of RMSE and NEES.

EXPERIMENTAL RESULTS

Figure 4A:
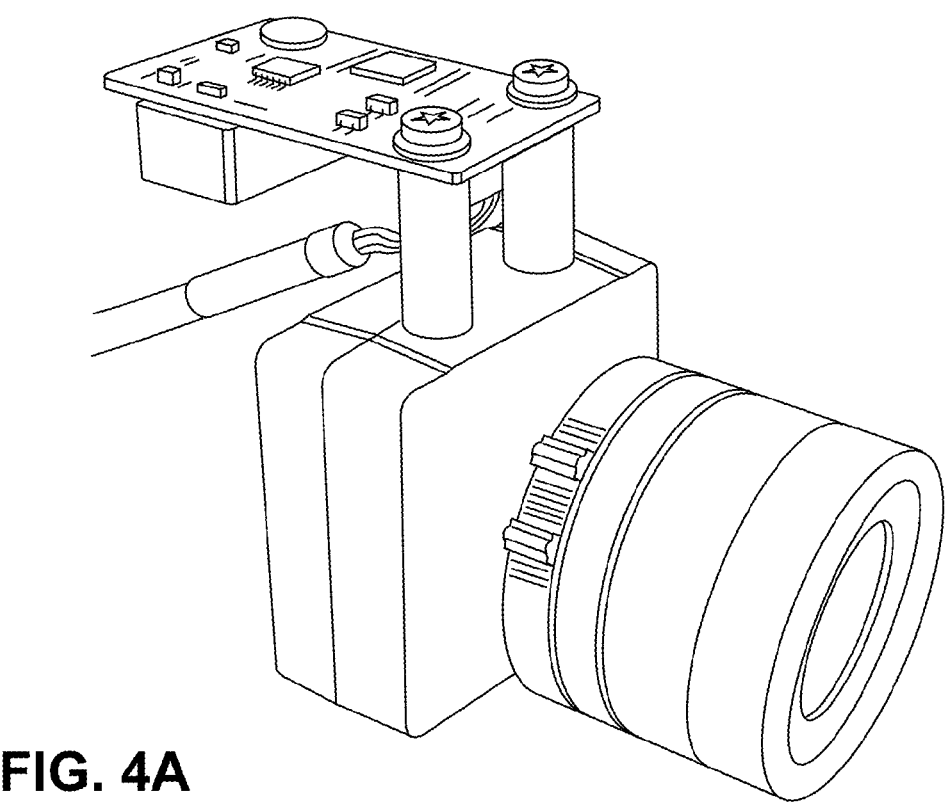
FIG. 4($a$) is a perspective diagram showing an experimental test bed that comprises a light-weight InterSense NavChip IMU and a Point Grey Chameleon Camera.
Figure 4B:
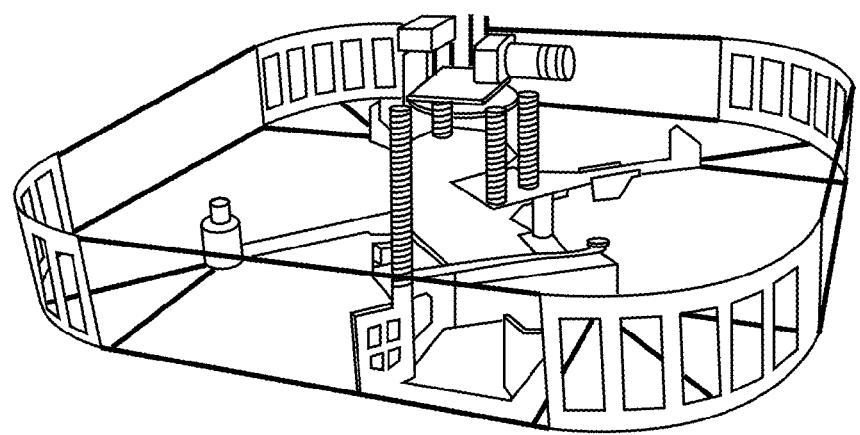

The proposed OC-VINS framework were also validated experimentally and compared with standard VINS approaches. Specifically, the performance of OC-V-SLAM and OC-MSC-KF were evaluated on both indoor and outdoor datasets. In the experimental setup, a light-weight sensing platform comprised of an InterSense NavChip IMU and a PointGrey Chameleon camera (see FIG. 4(a)) was utilized. IMU signals are sampled at a frequency of 100 Hz while camera images are acquired at 7.5 Hz. The dimensions of the sensing package in this example are approximately 6 cm tall, by 5 cm wide, by 8 cm deep.

During the indoor experimental tests, the sensing platform was mounted on an Ascending Technologies Pelican quadrotor equipped with a VersaLogic Core 2 Duo single board computer. For the outdoor dataset, the sensing platform was head-mounted on a bicycle helmet, and interfaced to a hand-held Sony Vaio. An overview of the system implementation is described, along with a discussion of the experimental setup and results.

Example Implementation

The image processing is separated into two components: one for extracting and tracking short-term opportunistic features (OFs), and one for extracting persistent features (PFs) to use in V-SLAM.

OFs are extracted from images using the Shi-Tomasi corner detector. After acquiring image k, it is inserted into a sliding window buffer of m images, {k−m+1, k−m+2, ..., k}. We then extract features from the first image in the window and track them pairwise through the window using the KLT tracking algorithm. To remove outliers from the resulting tracks, we use a two-point algorithm to find the essential matrix between successive frames. Specifically, given the filter's estimated rotation (from the gyroscopes' measurements) between image i and j, ${}^i_j\bar{q}$, we estimate the essential matrix from only two feature correspondences. This approach is more robust than the five-point algorithm because it provides two solutions for the essential matrix rather than up to ten. Moreover, it requires only two data points, and thus it reaches a consensus with fewer hypotheses when used in a RANSAC framework.

The PFs are extracted using SIFT descriptors. To identify global features observed from several different images, we first utilize a vocabulary tree (VT) structure for image matching. Specifically, for an image taken at time k, the VT is used to select which image(s) taken at times 1, 2, ..., k−1 correspond to the same physical scene. Among those images that the VT reports as potential matches, the SIFT descriptors from each of them are compared to those from image k to create tentative feature correspondences. The epipolar constraint is then enforced using RANSAC and Nister's five-point algorithm to eliminate outliers. It is important to note that the images used to construct the VT (offline) are not taken along our experimental trajectory, but rather are randomly selected from a set of representative images.

Experiment 1

Indoor Validation of OC-V-SLAM

In the first experimental trial, we compared the performance of OC-V-SLAM to that of Std-V-SLAM on an indoor trajectory. The sensing platform traveled a total distance of 172.5 m, covering three loops over two floors in Walter Library at the University of Minnesota. The quadrotor was returned to its starting location at the end of the trajectory, to provide a quantitative characterization of the achieved accuracy.

Opportunistic features were tracked using a window of m=10 images. Every m camera frames, up to 30 features from all available PFs are initialized and the state vector is augmented with their 3D coordinates. The process of initializing PFs is continued until the occurrence of the first loop closure; from that point on, no new PFs are considered and the filter relies upon the re-observation of previously initialized PFs and the processing of OFs.

Figure 5A:
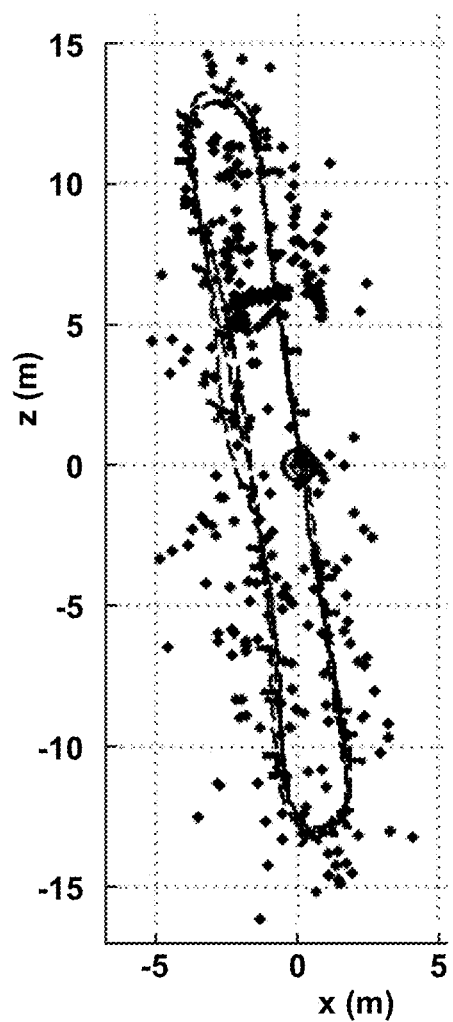
FIGS. 5($a$)-5($c$) are a set of plots associated with Experiment 1 including the estimated 3D trajectory over the three traversals of the two floors of the building, along with the estimated positions of the persistent features.
Figure 5B:
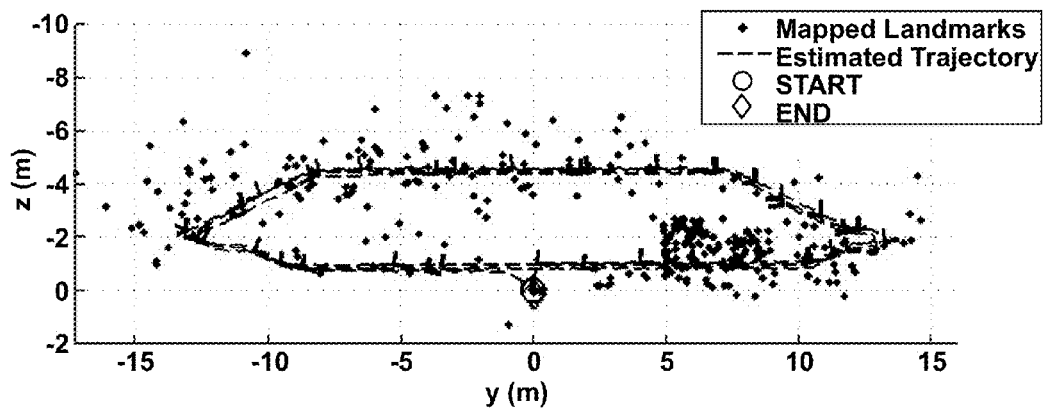
Figure 5C:
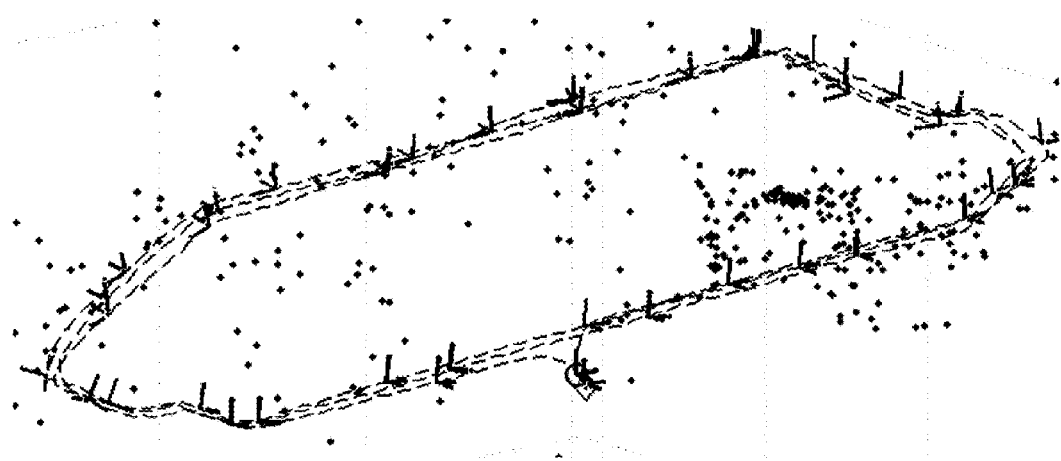

For both the Std-V-SLAM and the OC-V-SLAM, the final position error was approximately 34 cm, which is less than 0.2% of the total distance traveled (see FIG. 5). However, the estimated covariances from the Std-V-SLAM are smaller than those from the OC-V-SLAM (see FIGS. 6(a)-6(b)). Furthermore, uncertainty estimates from the Std-V-SLAM decreased in directions that are unobservable (i.e., rotations about the gravity vector); this violates the observability properties of the system and demonstrates that spurious information is injected to the filter.

Figure 6A:
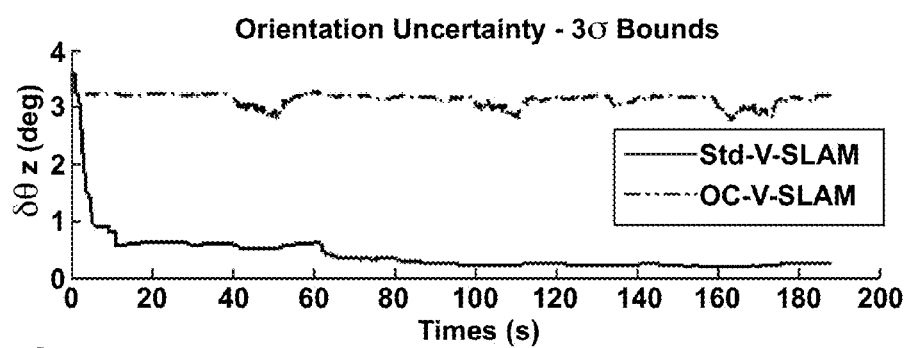
FIGS. 6($a$)-6($b$) are a set of plots associated with Experiment 1 including comparison of the estimated 3 $\sigma$ error bounds for attitude and position between Std-V-SLAM and OC-V-SLAM.
Figure 6B:
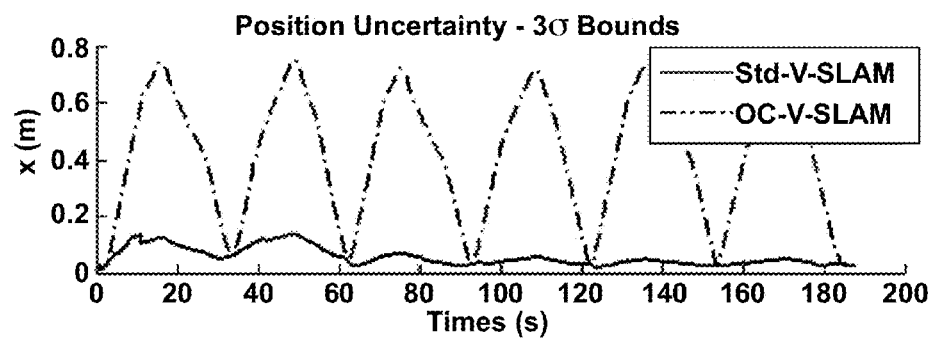

FIG. 6(a) highlights the difference in estimated yaw uncertainty between the OC-V-SLAM and the Std-V-SLAM. In contrast to the OC-V-SLAM, the Std-V-SLAM covariance rapidly decreases, violating the observability properties of the system. Similarly, large differences can be seen in the covariance estimates for the x-axis position estimates (see FIG. 6(b)). The Std-V-SLAM estimates a much smaller uncertainty than the OC-V-SLAM, supporting the claim that the Std-V-SLAM tends to be inconsistent.

Experiment 2

Indoor Validation of OC-MSC-KF

The proposed OC-MSC-KF was validated on real-world data. The first test comprised a trajectory 50 m in length that covered three loops in an indoor area, after which the testbed was returned to its initial position. At the end of the trajectory, the Std-MSC-KF had a position error of 18.73 cm, while the final error for the OC-MSC-KF was 16.39 cm (approx. 0.38% and 0.33% of the distance traveled, respectively). In order to assess the impact of inconsistency on the orientation estimates of both methods, the rotation between the first and last images computed independently using Batch Least-Squares (BLS) and feature point matches was used as ground truth. The Std-MSC-KF had final orientation error [0.15 −0.23 −5.13] degrees for roll, pitch, and yaw (rpy), while the rpy errors for the OC-MSC-KF were [0.19 −0.20 −1.32] degrees respectively.

Figure 7A:
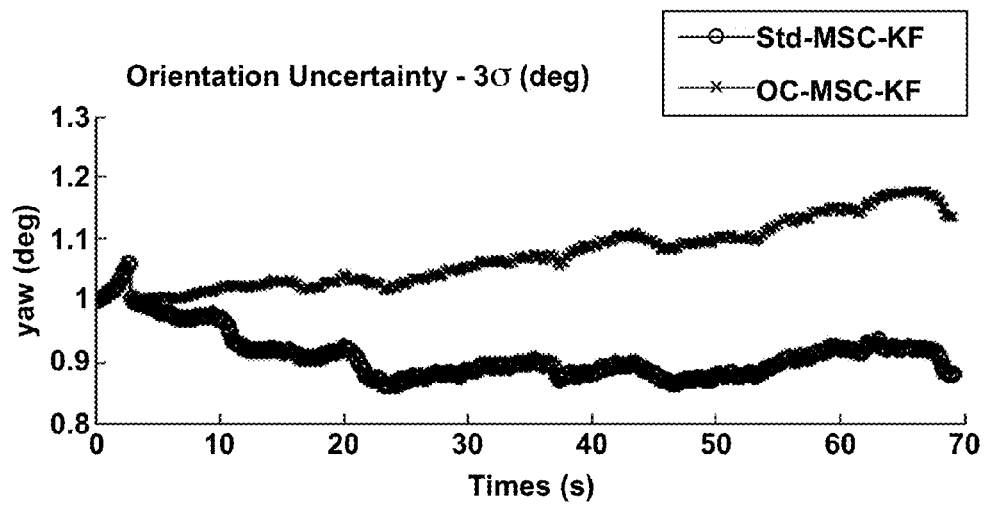
FIGS. 7($a$) and (7$b$) are a set of plots associated with Experiment 2 including the position (a) and orientation (b) uncertainties (3 $\sigma$ bounds) for the yaw angle and the y-axis, which demonstrate that the Std-MSC-KF gains spurious information about its orientation.
Figure 7B:
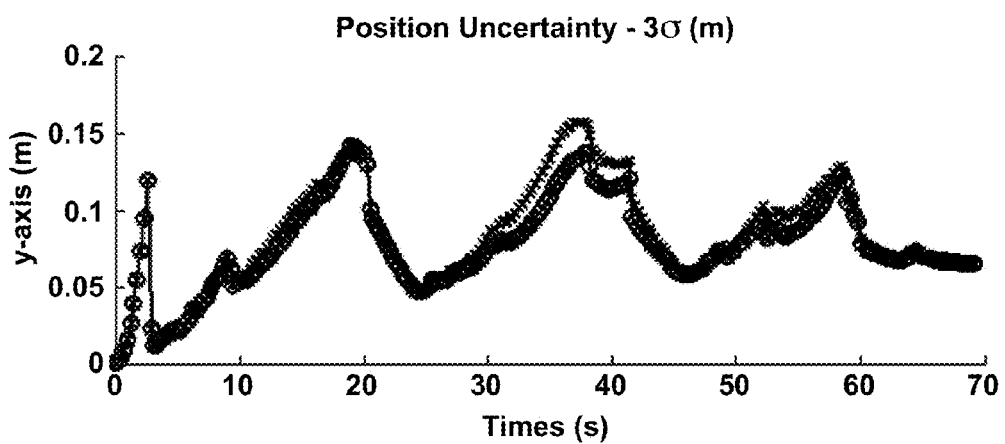
Figure 8A:
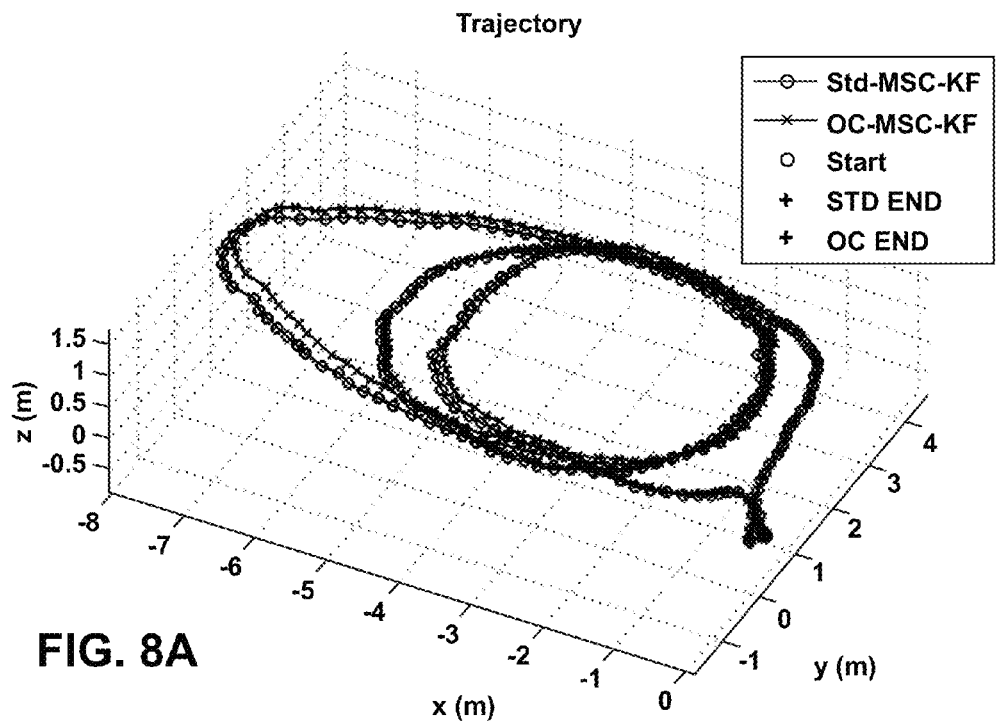
FIGS. 8(a) and 8(b) are another set of plots for Experiment 2: The 3D trajectory (a) and corresponding overhead (x-y) view (b).
Figure 8B:
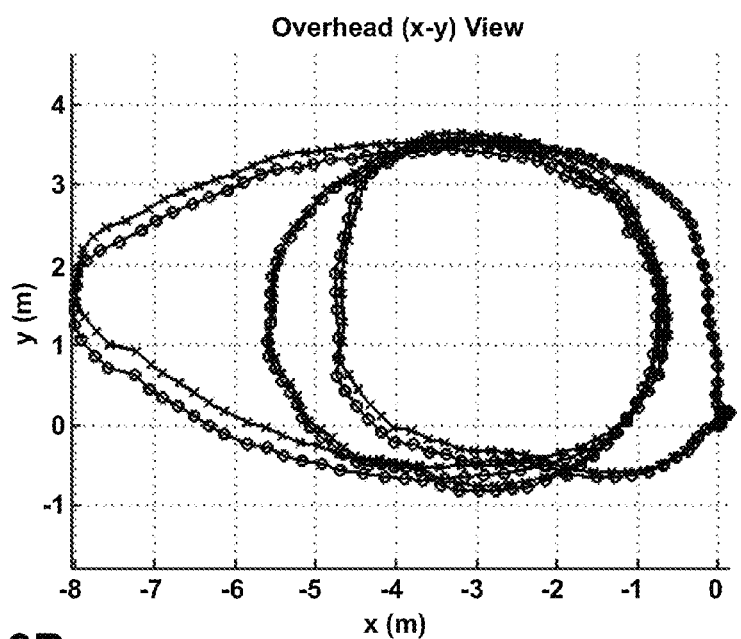

In addition to achieving higher accuracy, for yaw in particular, the OC-MSC-KF is more conservative since it strictly adheres to the unobservable directions of the system. This is evident in both the position and orientation uncertainties. The y-axis position and yaw angle uncertainties is plotted in FIG. 7, as representative results. Most notably, the yaw uncertainty of the OC-MSC-KF remains approximately 1.13 deg (3σ), while for the Std-MSC-KF it reduces to 0.87 deg (3σ). This indicates that the Std-MSC-KF gains spurious orientation information, which leads to inconsistency. Lastly, FIG. 8 shows the 3D trajectory along with an overhead (x-y) view. It is evident that the Std-MSC-KF yaw error impacts the position accuracy, as the Std-MSC-KF trajectory exhibits a rotation with respect to the OC-MSC-KF.

Experiment 3

Outdoor Validation of OC-MSC-KF

Figure 9A:
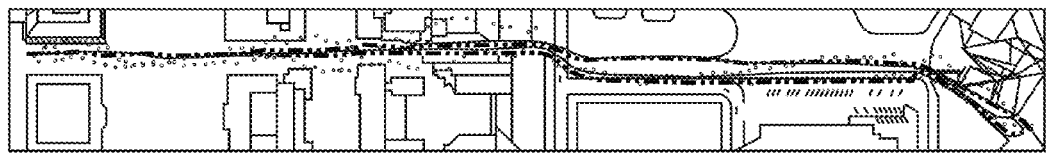
FIGS. 9(a)-9(c) are perspective diagrams associated with Experiment 3.

In the final experimental trial, the OC-MSC-KF was tested on a large outdoor dataset (approx. 1.5 km in length). FIG. 9(a) depicts the OC-MSC-KF (red) and the Std-MSC-KF (blue) trajectory estimates, along with position markers from a low-grade onboard GPS receiver (green). In order to assess the accuracy of both filters, the estimates are overlaid on an overhead image.

Figure 9B:
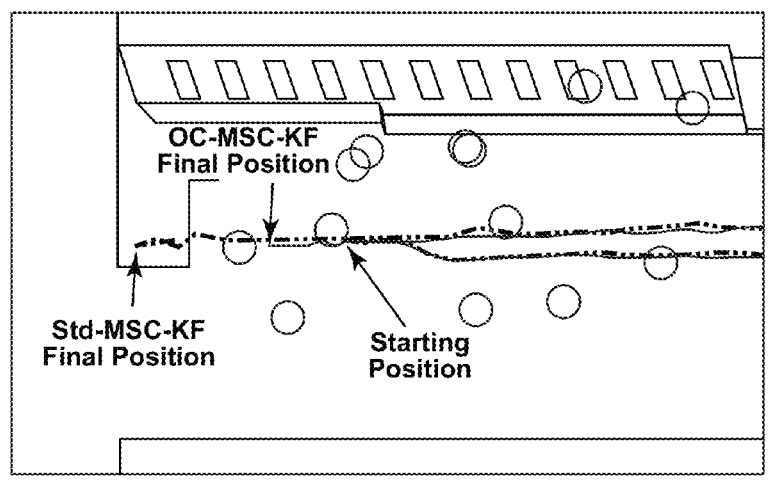

FIG. 9(b) depicts a zoomed-in plot of the starting location (center) for both filters, along with the final position estimates. In order to evaluate the accuracy of the proposed method, the sensing platform was returned to its starting location at the end of the trajectory. The OC-MSC-KF obtains a final position error of 4.38 m (approx. 0.3% of the distance traveled), while the Std-MSC-KF obtains a final position error of 10.97 m. This represents an improvement in performance of approximately 60%.

Figure 9C:
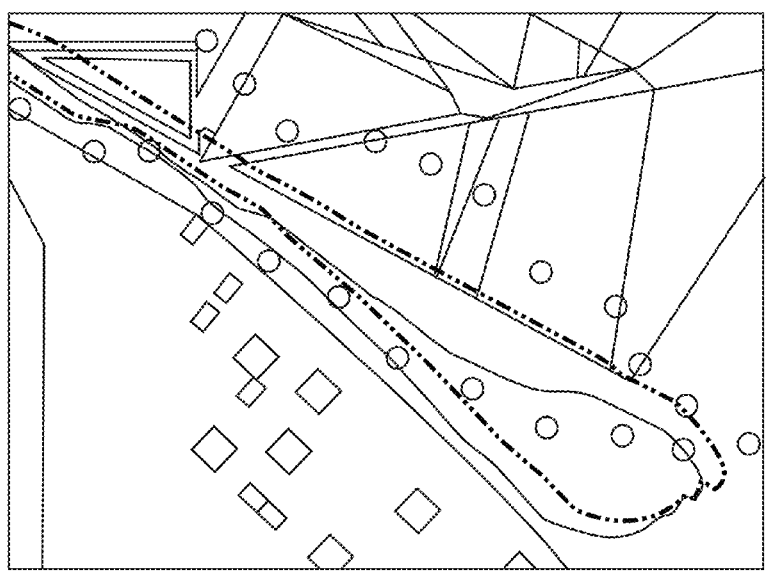

The filters' performance is also illustrated visually in FIG. 9(c) which shows a zoomed-in plot of the turn-around point. The OC-MSC-KF estimates remain on the light-brown portion of the ground (which is the sidewalk), which coincides with the true trajectory. In contrast, the Std-MSC-KF estimates drift over the dark triangles in the image, which are wading pools filled with water. This shifting of the trajectory represents a slight rotation around the vertical axis, indicating a violation of the rotation nullspace direction $N_r$.

Figure 10A:
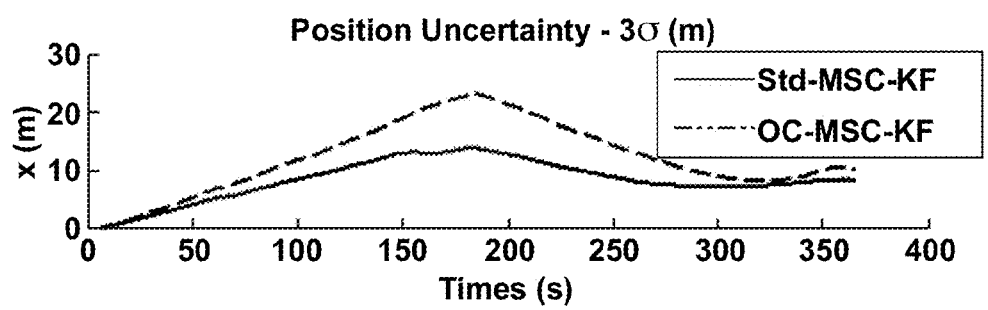
FIGS. 10(a) and 10(b) are a set of plots for Experiment 3.
Figure 10B:
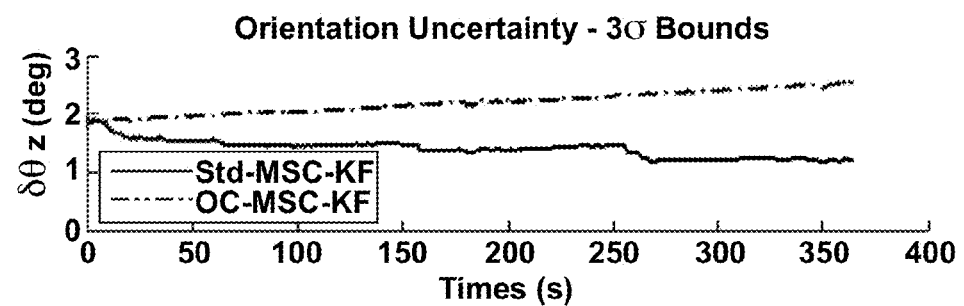

FIG. 10 depicts the uncertainty in the position estimates along the x-axis (perpendicular to the direction of motion), along with the uncertainty in yaw (corresponding to rotations about the gravity vector). In particular, FIG. 10(a) illustrates position uncertainty along the x-axis (perpendicular to the direction of motion) for the Std-MSC-KF, and OC-MSC-KF respectively. The OC-MSC-KF maintains more conservative estimates for position, indicating that the Std-MSC-KF may be inconsistent. FIG. 10(b) illustrates orientation uncertainty about the vertical axis (z). Since rotations about gravity are unobservable, the Std-MSC-KF should not gain any information in this direction. However, as evident from this plot, the Std-MSC-KF uncertainty reduces, indicating inconsistency. For the OC-MSC-KF, the uncertainty does not decrease, indicating that the OC-MSC-KF respects the unobservable system directions. It is clear that the Std-MSC-KF reduces its uncertainty in its heading direction, indicating that the filter gains spurious information, while the OC-MSC-KF does not gain information for the rotation around the gravity vector.

Camera Navigation Using Point and Plane Features

As explained above, over a short period of time, all six degrees of freedom of a robot's position and orientation (pose) can be obtained directly by integrating the rotational velocity and linear acceleration measurements from an Inertial Measurement Unit (IMU). However, due to the biases and noise in the IMU signals, errors in the robot pose estimates accumulate quickly over time rendering them unreliable. To deal with this problem, most inertial navigation systems (INS) rely on GPS for bounding the estimation error. Unfortunately, for robots operating in urban or indoor environments, the GPS signals are usually either unreliable or unavailable.

Compared to regular cameras, RGBD cameras provide both color images and the corresponding 3D point cloud, which simplifies the tasks of triangulating point-feature positions and extracting higher level features, such as planes, from the scene. To date, very few works exist that combine inertial and RGBD measurements for navigation. When using IMU and only point feature measurements, one degree of rotational freedom (yaw) of the IMU-RGBD camera is unobservable. As a result, the uncertainty and error in the yaw estimates will keep increasing, hence, adversely affecting the positioning accuracy. In this disclosure, it is demonstrated that by observing plane features of known directions, the yaw becomes observable and, thus, its uncertainty remains bounded.

In this section, a linear-complexity inertial navigation algorithm is presented that uses both point and plane features. In particular, system observability properties, including its observable modes and unobservable directions, are described. In example implementations, point feature measurements are processed using a tightly-coupled visual-inertial odometry, multi-state constraint Kalman filter (MSC-KF), with complexity linear in the number of observed point features. Additionally, the directions of the plane features are used as measurements in the extended Kalman filter update without including the plane feature poses in the state vector, hence ensuring linear complexity in the number of the observed plane features.

The observability of the IMU-RGBD camera navigation system when using both point and plane feature measurements is described, and it is proved that with a single plane feature of known direction, the IMU gyroscope bias is observable. If additionally a single point feature is detected, and the plane's normal vector is not aligned with gravity, all degrees of freedom of the IMU-RGBD camera navigation system, except the global position, become observable. Based on the observability analysis, the accuracy and consistency of the IMU-RGBD camera navigation system is improved by employing the observability-constrained extended Kalman filter that enforces the observability requirement. A linear-complexity algorithm for fusing inertial measurements with both point and plane features is presented and experimentally validated.

The rest of this section is structured as follows. First, the inertial navigation system model using both point and plane feature measurements is presented. A methodology for studying the observability properties of unobservable nonlinear systems is described. The method is applied to the specific IMU-RGBD camera navigation system, and its unobservable directions are described. The OC-EKF algorithm developed for improving the accuracy and consistency of the inertial navigation system based on its observability properties is presented. Experimental results for the performance of the proposed algorithm are described and assessed.

VINS Estimator Description

In this section, the system state and covariance propagation equations using inertial measurements are described. The measurement model for processing plane and point feature observations is presented.

System State and Propagation Model

In the IMU-RGBD camera navigation system, the state vector to be estimated can be represented as:

$$x = [^I q_G^T \ ^G v_I^T \ ^G p_I^T \ ^G p_f^T \ b_a^T \ b_g^T]^T$$

where $^I q_G$ is the unit quaternion representing the orientation of the global frame {G} in the IMU's frame of reference {I}, $^G v_I$ and $^G p_I$ represent the velocity and position of {I} in {G}, $^G p_f$ denotes the position of the point feature in {G}, $b_a$ and $b_g$ represent the gyroscope and accelerometer biases.

The system model describing the time evolution of the states can be represented as:

$$I\dot{q}_G(t) = \frac{1}{2}\Omega(I\omega(t))^I q_G(t) \quad (A.1)$$

$$G\dot{V}_I(t) = {}^G a(t)$$

$$G\dot{p}_I(t) = {}^G v_I(t) \ G\dot{p}_f(t) = 0_{3\times1}$$

$$\dot{b}_a(t) = w_{wa} \ \dot{b}_g(t) = w_{wg}$$

where $I\omega(t) = [\omega_1 \ \omega_2 \ \omega_3]^T$ and $Ga(t) = [a_1 \ a_2 \ a_3]^T$ are the system rotational velocity and linear acceleration expressed in {I} and {G} respectively, $w_{wa}$ and $w_{wg}$ are zero-mean white Gaussian noise processes driving the gyroscope and accelerometer biases $b_g$ and $b_a$, $^G g$ is the gravitational acceleration in {G}, $C(^I q_G(t))$ denotes the rotation matrix corresponding to $^I q_G(t)$, and $$\Omega(I\omega(t)) \triangleq \begin{bmatrix} -\lfloor I_\omega \rfloor & I_\omega \\ -I_\omega^T & 0 \end{bmatrix},$$

$$\lfloor I_\omega \rfloor \triangleq \begin{bmatrix} 0 & -\omega_3 & \omega_2 \\ -\omega_3 & 0 & -\omega_1 \\ -\omega_2 & \omega_1 & 0 \end{bmatrix}.$$

The gyroscope and accelerometer measurements, $\omega_m$ and $a_m$, are modeled as:

$$\omega_m(t) = {}^I\omega(t) + b_g + w_g(t) \quad (A.2)$$

$$a_m(t) = C(^I q_G(t))(^G a(t) - {}^G g) + b_a + w_a(t) \quad (A.3)$$

where $w_g$ and $w_a$ are zero-mean, white Gaussian noise processes. In order to determine the covariance propagation equation, we define the error-state vector as:

$$\tilde{x} = [\delta\theta_G^T \ ^G\tilde{v}_I^T \ ^G\tilde{p}_I^T \ ^G\tilde{p}_f^T \ \tilde{b}_a^T \ \tilde{b}_g^T]^T \quad (A.4)$$

Then, the linearized continuous-time error-state equation can be written as:

$$\dot{\tilde{x}} = F_c \tilde{x} + G_c w \quad (A.5)$$

where $w = [w_g^T \ w_{wg}^T \ w_a^T \ w_{wa}^T]^T$ denotes the system noise, $F_c$ is the continuous-time error-state transition matrix corresponding to the system state, and $G_c$ is the continuous-time input noise matrix. The system noise is modelled as a zero-mean white Gaussian process with autocorrelation $\mathbb{E}[w(t)w^T(\tau)] = Q_c \delta(t-\tau)$. To compute the propagated covariance, the discrete-time state transition matrix from time $t_k$ to $t_{k+1}$, $\Phi_k$ is found, and the system noise covariance matrix, $Q_k$, which can been computed as:

$$\Phi_k = \Phi(t_{k+1}, t_k) = \exp(\int_{t_k}^{t_{k+1}} F_c(\tau)d\tau) \quad (A.6)$$

$$Q_k = \int_{t_k}^{t_{k+1}} \Phi(t_{k+1},\tau) G_c Q_c G_c^T \Phi^T(t_{k+1},\tau)d\tau \quad (A.7)$$

The propagated covariance can be determined as:

$$P_{K+1|k} = \Phi_k P_{k|k} \Phi_k^T + Q_k \quad (A.8)$$

Measurement Model for Plane Features

For purposes of example, the IMU frame {I} and the RGBD-camera frame {C} are assumed to coincide. Let $^G n$ denote the normal vector to a plane, whose direction is assumed known in the global frame of reference, and thus we need not include it in the state vector. Planes are fitted in the 3D point cloud provided by the RGBD camera, and its normal vector, $z_{plane}$, is used as the plane feature measurement:

$$z_{plane} = C(\eta_\Theta)^I n = C(\eta_\Theta) C(^I q_G)^G n \quad (A.9)$$

where $\eta_\Theta = \alpha k$ is the measurement noise representing a rotation by an angle α around the unit vector k. Since $^G n$ is a unit norm vector, the measurement noise is modelled as an extra rotation of the plane's normal vector. Moreover, in order to avoid a singular representation of the noise covariance when processing this observation in the EKF, introduce the following modified measurement model is introduced:

$$\check{z}'_{plane} = \begin{bmatrix} z_{plane}(1)/z_{plane}(3) \\ z_{plane}(2)/z_{plane}(3) \end{bmatrix} \quad (A.10)$$

and the linearized error model is computed as:

$$\tilde{z}'_{plane} = z'_{plane} - \hat{z}'_{plane} = H_{plane}\tilde{x} + \eta_{plane} \quad (A.11)$$

where $\hat{z}'_{plane}$ is the expected measurement computed by evaluating (A.10) at the current state estimate and $\eta_\theta = 0$, $\eta_{plane}$ is the measurement noise, and the measurement Jacobian, $H_{plane}$, is computed using the chain rule as:

$$H_{plane} = H_c[H_{\theta_1} \ 0_{3\times 15}] \quad (A.12)$$

where $$H_c = \frac{\partial \check{z}'_{plane}}{\partial^I n} \quad (A.13)$$

$$= \frac{1}{\hat{z}_{plane}(3)^2} \begin{bmatrix} \hat{z}_{plane}(3) & 0 & -\hat{z}_{plane}(1) \\ 0 & \hat{z}_{plane}(3) & -\hat{z}_{plane}(2) \end{bmatrix}$$

$$H_{\theta_1} = \frac{\partial^I n}{\partial^I \hat{\theta}_G} = \lfloor C(^I\hat{q}_G)^G n \rfloor$$

Measurement Model for Point Features

The RGBD camera can directly measure the 3D position of a point feature $^I p_f$ in the IMU frame $\{I\}$ as:

$$z_{point} = {}^I p_f + \eta_{point} = C(^I q_G)(^G p_f - {}^G p_I) + \eta_{point} \quad (A.14)$$

The linearized error model is computed as:

$$\tilde{z}_{point} = z_{point} - \hat{z}_{point} = H_{point}\tilde{x} + \eta_{point} \quad (A.15)$$

where $\tilde{z}_{point}$ is the expected measurement computed by evaluating (14) at the current state estimate and $\eta_{point}$, while the measurement Jacobian, $H_{point}$, is $$H_{point} = [H_{\theta_2} \ 0_{3\times 3} \ H_p \ H_{p_f} \ 0_{3\times 6}] \quad (A.16)$$

where $$H_{\theta_2} = \frac{\partial z_{point}}{\partial^I \theta_G} = \lfloor C(^I\hat{q}_G)(^G\hat{p}_f - {}^G\hat{p}_I) \rfloor$$

$$H_p = \frac{\partial z_{point}}{\partial^G p} = -C(^I\hat{q}_G), H_{p_f} = \frac{\partial z_{point}}{\partial^G p_f} = C(^I\hat{q}_G)$$

Observability Analysis

In this section, a brief overview of the method for analyzing the observability of nonlinear systems is provided, and an extension for determining the unobservable directions of nonlinear systems is presented.

Observability Analysis with Lie Derivatives

Consider a nonlinear, continuous-time system:

$$\begin{cases} \dot{x} = f_0(x) + \sum_{i=1}^{l} f_i(x)u_i \\ y = h(x) \end{cases} \quad (A.17)$$

where $u = [u_1 \ldots u_l]^T$ is its control input, $x = [x_1 \ldots x_m]^T$ is the system's state vector, y is the system output, and $f_i$, $i = 0, \ldots, l$ are the process functions. The zeroth-order Lie derivative of a measurement function h is defined as the function itself:

$$\mathcal{L}^0 h = h(x) \quad (A.18)$$

and the span of the ith order Lie derivative is defined as:

$$\nabla \mathcal{L}^i h = \begin{bmatrix} \frac{\partial \mathcal{L}^i h}{\partial x_1} & \frac{\partial \mathcal{L}^i h}{\partial x_2} & \cdots & \frac{\partial \mathcal{L}^i h}{\partial x_m} \end{bmatrix} \quad (A.19)$$

For any ith order Lie derivative, $\mathcal{L}^i h$, the i+1th order Lie derivative $\mathcal{L}_{f_j}^{i+1} h$ with respect to any process function $f_j$ can be computed as:

$$\mathcal{L}_{f_j}^{i+1} h = \nabla \mathcal{L}^i h \cdot f_j \quad (A.20)$$

Finally, the observability matrix $\mathcal{O}$ of system (A.17) is defined as a matrix with block rows the span of the Lie derivatives of (A.17), i.e., $$\mathcal{O} = \begin{bmatrix} \nabla \mathcal{L}^0 h \\ \nabla \mathcal{L}_{f_i}^1 h \\ \nabla \mathcal{L}_{f_i f_j}^2 h \\ \nabla \mathcal{L}_{f_i f_j f_k}^2 h \\ \vdots \end{bmatrix} \quad (A.21)$$

where $i, j, k = 0, \ldots, l$. To prove that a system is observable, it suffices to show that any submatrix of $\mathcal{O}$ comprising a subset of its rows is of full column rank. In contrast, to prove that a system is unobservable and find its unobservable directions, we need to: (i) show that the infinitely many block rows of can be written as a linear combination of a subset of its block rows, which form a submatrix $\mathcal{O}$'; and (ii) find the nullspace of $\mathcal{O}$' in order to determine the system's unobservable directions. Although accomplishing (ii) is fairly straightforward, achieving (i) is extremely challenging especially for high-dimensional systems, such as the IMU-RGBD camera navigation system.

Observability Analysis with Basis Functions

To address this issue, techniques are leveraged in the observability analysis, which relies on change of variables for proving that a system is unobservable and finding its unobservable directions.

Theorem 1: Assume that there exists a nonlinear transformation $\beta(x) = [\beta_1(x)^T \ldots \beta_t(x)^T]^T$ (i.e., a set of basis functions) of the variable x in (A.17), such that:

(A1) $h(x) = h'(\beta)$ is a function of $\beta$.

$$\frac{\partial \beta}{\partial x} \cdot f_i, \quad (A2)$$

$i = 0, \ldots, l$, are functions of $\beta$;

(A3) $\beta$ is a function of the variables of a set S comprising Lie derivatives of system (17) from order zero up to order p, with $p < \infty$.

Then:
(i) The observability matrix of (17) can be factorized as:
$\mathcal{O} = \Xi \cdot B$, where $$B \triangleq \frac{\partial \beta}{\partial x}$$

and $\Xi$ is the observability matrix of the following system:

(ii)

$$\begin{cases} \dot{\beta} = g_0(\beta) + \sum_{i=1}^{l} g_i(\beta) u_i \\ y = h'(\beta) \end{cases} \quad (A.22)$$

where $$g_i(\beta) \triangleq \frac{\partial \beta}{\partial x} f_i(x), i = 0, \ldots l..$$

(iii) System (A.22) is observable.
(iv) Null ($\mathcal{O}$)=null(B).

Proof: The proof is given in C. X. Guo and S. I. Roumeliotis, "IMU-RGBD camera 3d pose estimation and extrinsic calibration: Observability analysis and consistency improvement," in Proc. of the IEEE International Conference on Robotics and Automation, Karlsruhe, Germany, May 6-10 2013, pp. 2920-2927, incorporated herein by reference.

Based on Theorem 1, the unobservable directions can be determined with significantly less effort. To find a system's unobservable directions, we first need to define the basis functions that satisfy conditions (A1) and (A3), and verify that condition (A2) is satisfied, or equivalently that the basis function set is complete. Once all the conditions are fulfilled, the unobservable directions of (A. 17) correspond to the nullspace of matrix B, which has finite dimensions, and thus it is easy to analyze.

Observability Analysis of the IMU-RGBD Camera Navigation System

In this section, Theorem 1 is leveraged to study the observability of the IMU-RGBD camera navigation system when using plane and point feature observations. To do this, the system's basis functions are found, which are also the observable modes, using only a single plane feature. Then, the basis function set for the IMU-RGBD camera navigation system is completed using both plane and point features. Finally, the unobservable directions of the IMU-RGBD camera navigation system when using only plane observations is found, and when using both plane and point feature measurements.

Basis Functions when Using Plane Features

For purposes of example, the orientation between the IMU frame {I} and the global frame {G} are expressed using the Cayley-Gibbs-Rodriguez parameters, ${}^I S_G$. Furthermore, we retain only a few of the subscripts and superscripts in the state vector which is expressed as:

$$x = [S^T \ v^T \ p^T \ p_f^T \ b_a^T \ b_g^T]^T$$

Employing the propagation model, the IMU-RGBD camera navigation system using only plane features can be written as:

$$\begin{bmatrix} \dot{s} \\ \dot{v} \\ \dot{p} \\ \dot{p}_f \\ \dot{b}_a \\ \dot{b}_g \end{bmatrix} = \begin{bmatrix} -\frac{1}{2} D b_g \\ g - C^T b_a \\ v \\ 0 \\ 0 \\ 0 \end{bmatrix} + \begin{bmatrix} \frac{1}{2} D \\ 0 \\ 0 \\ 0 \\ 0 \\ 0 \end{bmatrix} w + \begin{bmatrix} 0 \\ C^T \\ 0 \\ 0 \\ 0 \\ 0 \end{bmatrix} a \quad (A.23)$$

$$z_{plane} = C^G n$$

where $C \triangleq C(s)$ represents the rotation matrix corresponding to s, and $$D \triangleq 2 \frac{\partial s}{\partial \theta} = I + \lfloor s \times \rfloor + s s^T.$$

Note that $f_0$ is a 18×1 vector, while $f_1$ and $f_2$ are both 18×3 matrices which is a compact way for representing three process functions:

$$f_1 \omega = f_{11} \omega_1 + f_{12} \omega_2 + f_{13} \omega_3$$

$$f_2 a = f_{21} a_1 + f_{22} a_2 + f_{23} a_3 \quad (A.24)$$

To define the basis functions for this system, the conditions of Theorem 1 are followed: (i) Select basis functions so that the measurement function $z_{plane}$ can be expressed as a function of $\beta$; (ii) Select the remaining basis functions as functions of the system's Lie derivatives, until condition (A2), (i.e., $$\frac{\partial \beta}{\partial x} \cdot f_1$$

is a function of $\beta$ for any i), is satisfied by all the basis functions.

For this particular problem, the first set of basis functions are defined directly as the measurement function:

$$\beta_1 \triangleq z_{plane} = C^G n \quad (A.25)$$

where $\beta_1$ is a 3×1 vector representing in a compact form 3 basis functions. To check if condition (A2) of Theorem 1 is fulfilled, compute the span of $\beta_1$ is computed with respect to x $$\frac{\partial \beta_1}{\partial x} = \begin{bmatrix} \frac{\partial \beta_1}{\partial \theta} \frac{\partial \theta}{\partial s} & \frac{\partial \beta_1}{\partial v} & \frac{\partial \beta_1}{\partial p} & \frac{\partial \beta_1}{\partial p_f} & \frac{\partial \beta_1}{\partial b_a} & \frac{\partial \beta_1}{\partial b_g} \end{bmatrix}$$

$$= \begin{bmatrix} \lfloor C^G n \rfloor \frac{\partial \theta}{\partial s} & 0 & 0 & 0 & 0 & 0 \end{bmatrix}$$

and project it onto all the process functions:

$$\frac{\partial \beta_1}{\partial x} \cdot f_0 = -\lfloor C^G n \rfloor b_g \quad (A.26)$$

$$\frac{\partial \beta_1}{\partial x} \cdot f_{1i} = \lfloor C^G n \rfloor e_i = -\lfloor e_i \rfloor C^G n \quad (A.27)$$

-continued $$\frac{\partial \beta_{1j}}{\partial x} \cdot f_{2i} = 0 \qquad (A.28)$$

where $i = 1, 2, 3,$
$e_1 = [1\ 0\ 0]^T,$
$e_2 = [0\ 1\ 0]^T,$
$e_3 = [0\ 0\ 1]^T,$
$\frac{\partial \theta}{\partial s}\frac{1}{2}D = \frac{\partial \theta}{\partial s}\frac{\partial s}{\partial \theta} = I_3$ As such, $$\frac{\partial \beta_{1j}}{\partial x} \cdot f_0$$

contains $b_g$, and thus is not a function of the previously defined basis function $\beta_1$. To proceed, condition (A3) of Theorem 1 is used to define additional basis functions as nonlinear combinations of the system's Lie derivatives.

Since the basis function $\beta_1$ is the zeroth-order Lie derivative of the measurement $h=z_{plane}$, then by definition, (A.26) is one of the first-order Lie derivatives:

$$\frac{\partial \beta_1}{\partial x} \cdot f_0 = \mathcal{L}_{f_0}^1 h$$

Hereafter, this fact used to define more basis functions. By definition, the second-order Lie derivative $\mathcal{L}_{f_0 f_{1i}}^2 h$ can be computed as $$\mathcal{L}_{f_0 f_{1i}}^2 h = \nabla \mathcal{L}_{f_0}^1 h \cdot f_{1i} = -\lfloor \lfloor C^G n \rfloor e_i \rfloor b_g \qquad (A.29)$$

If equation (A.29), for $i=1, 2, 3$, is stacked into a matrix form $$\begin{bmatrix} \mathcal{L}_{f_0 f_{11}}^2 h \\ \mathcal{L}_{f_0 f_{12}}^2 h \\ \mathcal{L}_{f_0 f_{13}}^2 h \end{bmatrix} = -\begin{bmatrix} \lfloor \lfloor C^G n \rfloor e_1 \rfloor \\ \lfloor \lfloor C^G n \rfloor e_2 \rfloor \\ \lfloor \lfloor C^G n \rfloor e_3 \rfloor \end{bmatrix} b_g \qquad (A.30)$$

since Y is a 9×3 matrix of full column rank, $b_g$ can be determined in terms of the Lie derivatives $\mathcal{L}_{f_0 f_{1i}}^2 h$ and $\beta_1 = C^G n$. Therefore, $b_g$ is a function of the Lie derivatives, and we define it as a new basis function:

$$\beta_2 \triangleq b_g \qquad (A.31)$$

Then, if the span of $\beta_2$ is computed and projected onto the process functions, the result is $$\frac{\partial \beta_2}{\partial x} \cdot f_0 = 0 \frac{\partial \beta_2}{\partial x} \cdot f_{1i} = 0 \frac{\partial \beta_2}{\partial x} \cdot f_{2i} = 0 \qquad (A.32)$$

which are all zeros, and thus do not contain any term not belonging to the previously defined basis functions. Therefore, a complete basis function set of the IMU-RGBD camera navigation system has been found using a single plane feature.

Basis Functions when Using Both Plane and Point Features

The basis functions of the IMU-RGBD camera navigation system using only a single point feature are:

$$[\beta_3\ \beta_4\ \beta_5\ \beta_6\ \beta_7] = [C(p_f - p)\ b_g\ Cv\ Cg\ b_a] \qquad (A.33)$$

Since the basis functions are also the system's observable modes, the complete basis function set of the IMU-RGBD camera navigation system when using both plane and point features is the union of the basis function sets, $\{\beta_3, \beta_2\}$ (resulting from measurements of the plane feature), and $\{\beta_3, \beta_4, \beta_5, \beta_6, \beta_7\}$ (computed for observations of the point feature). Hereafter, the union of these two basis function sets is determined after removing redundant elements.

First, since $\beta_2 = \beta_4 = b_g$, we have $\beta_2 \cap \beta_4 = b_g$. Then, under the assumption that the normal vector of the observed plane is not parallel to gravity, $C = C(s)$ can be expressed in terms of $^G n$, g, $\beta = C^G n$, and $\beta_6 = Cg$. Since both $^G n$ and g are known quantities, we have $\beta_1 \cap \beta_6 = s$. Therefore, the basis functions of the IMU-RGBD camera navigation system using both plane and point features are:

$$\beta' = \begin{bmatrix} \beta'_1 \\ \beta'_2 \\ \beta'_3 \\ \beta'_4 \\ \beta'_5 \end{bmatrix} = \begin{bmatrix} C(p_f - p) \\ s \\ Cv \\ b_g \\ b_a \end{bmatrix} \qquad (A.34)$$

with which, we leverage result (i) of Theorem 1 to construct the observable system in terms of the basis functions as:

$$\dot{\beta}' = \frac{\partial \beta'}{\partial x} \dot{x} = \frac{\partial \beta'}{\partial x}\left(f_0(x) + \sum_{i=1}^{l} f_i(x)u_i\right) \qquad (A.35)$$

$$= \begin{bmatrix} -\lfloor C(p_f - p) \rfloor b_g - Cv \\ -\frac{1}{2}Db_g \\ -\lfloor Cv \rfloor b_g + Cg - b_a \\ 0 \\ 0 \end{bmatrix} + \begin{bmatrix} \lfloor C(p_f - p) \rfloor \\ \frac{1}{2}D \\ \lfloor Cv \rfloor \\ 0 \\ 0 \end{bmatrix} \omega + \begin{bmatrix} 0 \\ 0 \\ I \\ 0 \\ 0 \end{bmatrix} a$$

$$= \begin{bmatrix} -\lfloor \beta'_1 \rfloor \beta'_4 - \beta'_3 \\ -\frac{1}{2}D(\beta'_2)\beta'_4 \\ -\lfloor \beta'_3 \rfloor \beta'_4 + C(\beta'_2)g - \beta'_5 \\ 0 \\ 0 \end{bmatrix} + \begin{bmatrix} \lfloor \beta'_1 \rfloor \\ \frac{1}{2}D(\beta'_2) \\ \lfloor \beta'_3 \rfloor \\ 0 \\ 0 \end{bmatrix} \omega + \begin{bmatrix} 0 \\ 0 \\ I \\ 0 \\ 0 \end{bmatrix} a$$

where $D(\beta'_2) \triangleq I + \lfloor \beta'_2 \rfloor + \beta'_2 \beta'_2{}^T$. System (A.35) is actually a minimal representation of the IMU-RGBD camera navigation system using both plane and point features. Hereafter, how to find the unobservable directions of the IMU-RGBD camera navigation system is shown by leveraging result (iii) of Theorem 1.

Determining the System's Unobservable Directions

In this section, the unobservable directions of the IMU-RGBD camera navigation system is first determined when observing only a single plane feature by computing the nullspace of the basis functions' span, $$B_1 \triangleq \begin{bmatrix} \frac{\partial \beta_1^T}{\partial x} & \frac{\partial \beta_2^T}{\partial x} \end{bmatrix}^T.$$

Then, the unobservable directions of the IMU-RGBD camera navigation system when observing both a single plane feature and a single point feature is found by computing the nullspace of $$B_2 \triangleq \frac{\partial \beta'}{\partial x}.$$

Theorem 2: The IMU-RGBD camera navigation system observing a single plane feature is unobservable, and its unobservable directions are spanned by the IMU-RGBD camera orientation around the plane's normal vector and the accelerometer bias in the IMU frame {I}, as well as the IMU-RGBD camera position, velocity, and the point feature position in the global frame {G}.

Proof: In the previous section, it was shown that the basis function set $\{\beta_1, \beta_2\}$ satisfies all three conditions of Theorem 1. Therefore, the system's unobservable directions span the nullspace of matrix $B_1$, which is formed by stacking the spans of the basis functions $\beta_1$ and $\beta_2$ as:

$$\begin{bmatrix} \lfloor C^G n \rfloor \frac{\partial \theta}{\partial s} & 0 & 0 & 0 & 0 & 0 \\ 0 & 0 & 0 & 0 & 0 & I \end{bmatrix} \quad (A.36)$$

It can be seen that the nullspace of $B_1$ is spanned by:

$$N_{plane} \triangleq \begin{bmatrix} \frac{\partial s}{\partial \theta} C^G n & 0 & 0 & 0 & 0 \\ 0 & I & 0 & 0 & 0 \\ 0 & 0 & I & 0 & 0 \\ 0 & 0 & 0 & I & 0 \\ 0 & 0 & 0 & 0 & I \\ 0 & 0 & 0 & 0 & 0 \end{bmatrix} = N_{plane}^g N_{plane}^p \quad (A.37)$$

where $N_{plane}^g$ (the first column of $N_{plane}$) corresponds to the IMU-RGBD camera's rotation around the plane feature's normal vector, and $N_{plane}^p$ (the remaining columns of $N_{plane}$) denotes the unobservable directions in the IMU-RGBD camera velocity, position, the point feature position, and the accelerometer bias.

In contrast, when both point and plane feature measurements are available, we have:

Theorem 3: The IMU-RGBD camera navigation system using a single point feature and a single plane feature (of known direction which is not parallel to gravity) is unobservable, and its unobservable subspace is spanned by 3 directions corresponding to the IMU-RGBD camera position in the global frame {G}.

Proof: Employing result (iii) of Theorem 1, the system's unobservable directions can be determined by computing the nullspace of the span $B_2$ of the corresponding basis functions $\beta'$, where $$B_2 = \begin{bmatrix} \lfloor C(p_f - p) \rfloor \frac{\partial \theta}{\partial s} & 0 & -C & C & 0 & 0 \\ I & 0 & 0 & 0 & 0 & 0 \\ \lfloor C v \rfloor \frac{\partial \theta}{\partial s} & C & 0 & 0 & 0 & 0 \\ 0 & 0 & 0 & 0 & 0 & I \\ 0 & 0 & 0 & 0 & I & 0 \end{bmatrix} \quad (A.38)$$

Let $N = [N_1^T N_2^T N_3^T N_4^T N_5^T N_6^T]^T$ be the right nullspace of matrix $B_2$. Hereafter, the relation $B_2 N = 0$ is used to determine the elements of N. Specifically, from the second, fourth, and fifth block rows of the product $B_2 N$, we have:

$$N_1 = N_5 = N_6 = 0_3 \quad (A.39)$$

Then, from the first and third block rows of $B_2 N$, we have $N_3 = N_4 - I_3$, and $N_2 = 0_3$. Using Gaussian elimination, it is easy to show that the rank of matrix $B_2$ is 15. Thus, the dimension of its right nullspace is exactly three, and the system's unobservable directions are spanned by:

$$N \triangleq [0_3 \; 0_3 \; I_3 \; I_3 \; 0_3 \; 0_3]^T \quad (A.40)$$

which corresponds to the global position of the IMU-RGBD camera and the point feature. Intuitively, this means that translating the IMU-RGBD camera and the point feature positions concurrently has no impact on the system's measurements.

The unobservable directions of the IMU-RGBD camera navigation system using only a single point feature are spanned by:

$$N_{point} \triangleq \begin{bmatrix} \frac{\partial s}{\partial \theta} Cg & 0_3 \\ -\lfloor v \rfloor g & 0_3 \\ -\lfloor p \rfloor g & I_3 \\ 0_3 & 0_3 \\ 0_3 & 0_3 \end{bmatrix} = [N_{point}^g \; N_{point}^p] \quad (A.41)$$

Note that $N = N_{plane} \cap N_{point}$, which makes sense because any unobservable quantity of the IMU-RGBD camera navigation system using both point and plane feature observations, must be unobservable when the system uses either plane or point feature measurements.

Algorithm Description

This section presents an example IMU-RGBD camera navigation algorithm employing the observability constrained (OC)-EKF, which seeks to maintain the original system's observability properties in the linearized implementation (EKF). In particular, the implementation of the OC-EKF for processing point feature measurements is described. Then, it is proved that once the OC-EKF is employed for point feature measurements, the observability constraint is automatically satisfied for the plane feature measurements.

A system's observability Gramian, M, is defined as:

$$M = \begin{bmatrix} H^1 \\ H^2 \Phi^{2,1} \\ \vdots \\ H^k \Phi^{k,1} \end{bmatrix} \quad (A.42)$$

where $\Phi^{k,1} \triangleq \Phi^{k-1} \ldots \Phi^1$ is the state transition matrix from time step 1 to k, and $H^k$ is the measurement Jacobian at time step k. A system's unobservable directions, N, are supposed to span the observability Gramian's nullspace:

$$MN = 0 \quad (A.43)$$

However, (A.43) does not hold when a nonlinear system is linearized using the current state estimate. As a consequence, the EKF gains spurious information along unobservable directions, which results in smaller uncertainty (that causes the filter to be inconsistent) and larger estimation errors. To address this issue, the OC-EKF modifies the state transition and measurement Jacobian matrices in such a way so that the resulting linearized system adheres to the observability properties of the original nonlinear system. In particular, (A.43) can be satisfied by enforcing the following two constraints:

$$N^{k+1} = \Phi^k N^k \quad (A.44)$$

$$H^k N^k = 0, \forall k > 0 \quad (A.45)$$

where $N^k$ and $N^{k+1}$ are the unobservable directions evaluated at time-steps k and k+1. Hereafter, an example implementation of the algorithm is described. Further example details can be found in C. X. Guo and S. I. Roumeliotis, "Observability-constrained EKF implementation of the IMU-RGBD camera navigation using point and plane features," University of Minnesota, Tech. Rep., March 2013., incorporated herein by reference.

Observability Constraint for Point Feature Measurements

In this section, the implementation of the OC-EKF for the IMU-RGBD camera navigation system using point feature measurements is presented.

Modification of the State Transition Matrix $\Phi^k$:

To start, the state transition matrix, $\Phi^k$, is modified according to the observability constraint (A.44)

$$N_{point}^{k+1} = \Phi^k N_{point}^k \quad (A.46)$$

where $N_{point}^k$ and $N_{point}^{k+1}$, defined in (41), are the unobservable directions when using only point features, at time-steps k and k+1 respectively, and $\Phi^k$ has the following structure:

$$\begin{bmatrix} \Phi_{11} & 0_3 0_3 & 0_3 0_3 & \Phi_{16} \\ \Phi_{21} & I_3 0_3 & 0_3 \Phi_{25} & \Phi_{26} \\ \Phi_{31} & \delta t I_3 I_3 & 0_3 \Phi_{35} & \Phi_{36} \\ 0_3 & 0_3 0_3 & I_3 0_3 & 0_3 \\ 0_3 & 0_3 0_3 & 0_3 I_3 & 0_3 \\ 0_3 & 0_3 0_3 & 0_3 0_3 & I_3 \end{bmatrix} \quad (A.47)$$

The observability constraint (A.46) is equivalent to the following three constraints:

$$\Phi_{11} C^k g = C^{k+1} g \quad (A.48)$$

which is satisfied by modifying $\Phi_{11}^* = C^{k+1} C^{k^T}$, and $$\Phi_{21} C^k g = \lfloor v^k \rfloor g - \lfloor v^{k+1} \rfloor g \quad (A.49)$$

$$\Phi_{31} C^k g = \delta t \lfloor v^k \rfloor g + \lfloor p^k \rfloor g - \lfloor p^{k+1} \rfloor g \quad (A.50)$$

which can be formulated and solved analytically as a constrained optimization problem where we seek to find the closest, in the Frobenius norm, $\Phi_{21}^*$ and $\Phi_{31}^*$ that satisfy constraints (A.49) and (A.50).

Modification of the Measurement Jacobian $H_{point}$:

During the update, we seek to modify the Jacobian matrix $H_{point}^k$ so as to fulfill constraint (A.45), i.e., $$H_{point}^k N_{point}^k = 0 \quad (A.51)$$

Substituting $H_{point}^k$ and $N_{point}^k$, as defined in (A. 16) and (A.40) respectively, into (A.51), it can be shown that (A.51) is equivalent to the following two constraints $$\begin{bmatrix} H_{\theta_2}^k & H_p^k \end{bmatrix} \begin{bmatrix} C^k g \\ \lfloor {}^L p_f^k \rfloor - \lfloor {}^L p^k \rfloor g \end{bmatrix} = 0 \quad (A.52)$$

$$H_{p_f}^k = H_p^k \quad (A.53)$$

As before, we can analytically determine $H_{\theta_2}^{k*}$ and $H_p^{k*}$ that are closest to $H_{\theta_2}^k$ and $H_p^k$ in the Frobenius norm, which also satisfy the constraint (A.52), and select $H_{p_f}^{k*} = H_p^{k*}$.

Observability Constraint for Plane Feature Measurements

In this section, it is proved that once the OC-EKF is applied to the IMU-RGBD camera navigation system using point feature measurements, the observability constraint (A.43) is automatically satisfied for the plane feature measurements.

Substituting $\Phi^k$ and $H_{plane}^k$ into the observability Gramian $M_{plane}$ for plane feature measurements, the first block row of $M_{plane}$ is just the measurement Jacobian matrix $$M_{plane}(1) = H_{plane}^1 = H_C^1 / [\lfloor C({}^I q_G^1)^G n \rfloor 0_{3 \times 15}] \quad (A.54)$$

while the kth block row is computed as $$M_{plane}(k) = H_{plane}^k \Phi^{k,1}$$

$$= H_{plane}^k \Phi^{k-1} \ldots \Phi^1$$

$$= H_c^k \left[ \lfloor C({}^I q_G^k)^G n \rfloor \prod^k 0_{3 \times 12} \psi^k \right]$$

where $\Pi^k \Phi_{11}^{k-1} \ldots \Phi_{11}^1$, and $\psi^k$ is a time-varying matrix that does not affect the current analysis. When applying the OC-EKF to point features, $\Phi_{11}^k = C^{k+1} C^{k^T}$ is modified. Therefore, multiplying $N_{plane}^g$ and $N_{plane}^p$ to the right hand side of $M_{plane}$, we have:

$$M_{plane}(1) N_{plane}^g = H_c^1 \lfloor C({}^I q_G^1)^G n \rfloor C({}^I q_G^1)^G n$$

$$= 0$$

$$M_{plane}(k) N_{plane}^g = H_c^k \lfloor C({}^I q_G^k)^G n \rfloor \Phi_{11}^{k-1} \ldots \Phi_{11}^1 C({}^I q_G^1)^G n$$

$$= H_c^k \lfloor C({}^I q_G^k)^G n \rfloor C^k C^{k-1^T} \ldots C^2 C^1 C({}^I q_G^1)^G n$$

$$= H_c^k \lfloor C({}^I q_G^k)^G n \rfloor C({}^I q_G^1)^G n$$

$$= 0$$

$$M_{plane}(1) N_{plane}^p = M_{plane}(k) N_{plane}^p$$

$$= 0$$

Thus, $M_{plane} N_{plane} = 0$ is automatically satisfied. In summary, after enforcing the observability constraint for point feature measurements on the state transition matrix, $\Phi^k$, the observability constraint (A.43) is automatically satisfied for the plane feature measurements.

EXPERIMENTAL RESULTS

An experimental setup was constructed comprising an InterSense™ NavChip IMU and a Kinect™ sensor, which contained an RGB camera and an infrared (IR) depth-finding camera. The intrinsic parameters of the Kinect RGB camera and IR camera, as well as the transformation between them, were determined offline using the algorithm described in D. Herrera, J. Kannala, and J. Heikkila, "Joint depth and color camera calibration with distortion correction," IEEE Trans. on Pattern Analysis and Machine Intelligence, vol. 34, no. 10, pp. 2058-2064, October 2012, incorporated herein by reference. The IMU signals were sampled at 100 Hz, and the Kinect provided RGBD images at a frequency of 6.3 Hz. The plane features are extracted from the RGBD images using the method proposed in C. Erdogan, M. Paluri, and F. Dellaert, "Planar segmentation of RGBD images using fast linear fitting and markov chain monte carlo," in Proc. of the IEEE International Conference on Computer and Robot Vision, Toronto, Canada, May 27-30 2012, pp. 32-39, incorporated herein by reference.

In the experiment, which took place in an office environment, a person holding the IMU-Kinect pair traversed for about 185 meters in two floors of a building, and returned to the initial position. Using the data collected, the final position error of the following five algorithms was examined:

1) MSC-KF: The Multi-state constraint Kailman filter of using only point feature measurements.
2) MSC-KF w/ Planes: The MSC-KF that processes both point and plane feature measurements.
3) OC-MSC-KF: The observability-constrained MSC-KF using only point feature measurements.
4) OC-MSC-KF w/ Planes: The proposed algorithm described herein, in which both point and plane feature measurements are processed with the OC-MSC-KF.
5) OC-MSC-KF SLAM: In this algorithm, most of the point features are processed as in the OC-MSC-KF, while also simultaneously building a map with a small portion of the observed point features using SLAM. This algorithm is generally viewed to be much more accurate compared to the previous algorithms (as shown in our experiment), because the filter can close loops when observing the same point features again. However, SLAM has a computational cost that is much higher (quadratic in terms of the number of estimated point features), compared to the MSC-KF (linear in the number of estimated point features). In our experiment, it is used as a benchmark to examine the performance of the other algorithms.

TABLE 1

CLOSE-LOOP ERRORS

| Estimation Algorithm | Final Error (m) | Pct. (%) |
|---|---|---|
| MSC-KF | 3.22 | 1.74 |
| MSC-KF w/Planes | 1.57 | 0.85 |
| OC-MSC-KF | 2.37 | 1.28 |
| OC-MSC-KF w/Planes | 1.46 | 0.79 |
| OC-MSC-KF SLAM | 0.093 | 0.05 |

Figure 11:
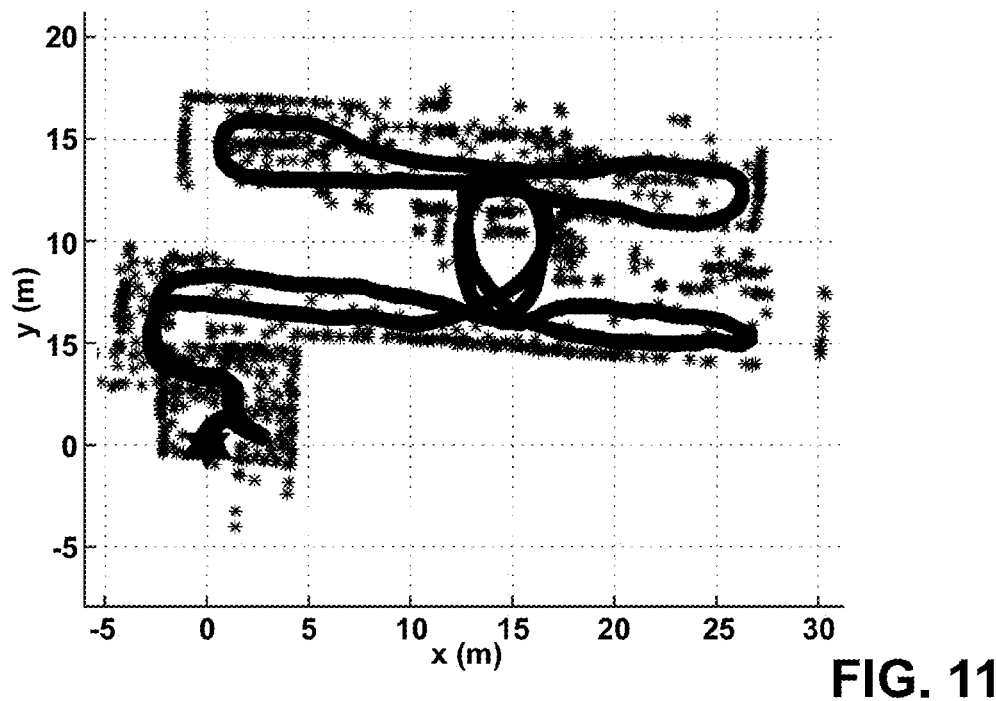
FIG. 11 is a graph showing an overhead x-y view of the IMU-Kinect 3D trajectory and the point features estimated by the OC-MSC-KF SLAM.
Figure 12:
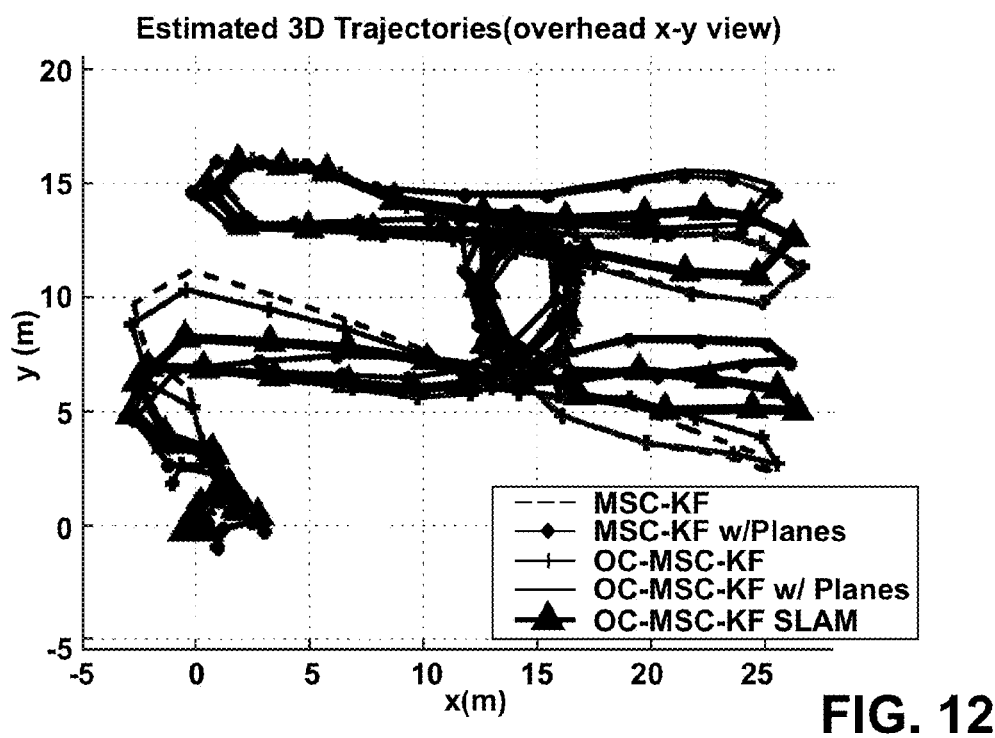
FIG. 12 is a graph showing IMU-Kinect trajectory estimated by the compared algorithms. The black triangle denotes the initial position of the IMU-Kinect pair.

FIG. 11 is a graph showing the overhead x-y view of the IMU-Kinect 3D trajectory and the point features estimated by the OC-MSC-KF SLAM. FIG. 12 is a graph showing IMU-Kinect trajectory estimated by the compared algorithms. The black triangle denotes the initial position of the IMU-Kinect pair. The 3D trajectory of the IMU-Kinect pair and the point features, estimated by OC-MSC-KF SLAM, are plotted in FIG. 11. The 3D trajectories estimated by the algorithms considered are shown in FIG. 12, and their final errors are reported in Table I.

As expected, OC-MSC-KF SLAM has the lowest final error, and our proposed algorithm, OC-MSC-KF w/ Planes, outperforms the other four algorithms. Additionally, the algorithms using both point and plane feature measurements (MSC-KF w/ Planes and OC-MSC-KF w/ Planes), have much smaller final error and perform closer to the OC-MSC-KF SLAM. This is because the plane features provide periodic corrections to the IMU-RGBD camera pair's orientation, thus also improving its position estimation accuracy. Finally, we note that enforcing the observability constraints (OC-MSC-KF and OC-MSC-KF w/ Planes) results in better accuracy since the filters do not process spurious information.

The previous section presented presents an algorithm for fusing inertial measurements, as well as point and plane feature observations captured from one or more image sources, such as an IMU-RGBD camera navigation system. Specifically, it was shown that by observing only a single plane feature of know direction, only the plane's direction in the IMU frame and the gyroscope bias are observable. Then, it was shown that by observing a single point feature and a single plane feature, of known direction other than the gravity, all the estimated quantities in the IMU-RGBD camera navigation system become observable, except the IMU-RGBD camera position in the global frame. Based on the observability analysis, an OC-EKF was described that significantly improves the estimation accuracy and consistency by removing spurious information along unobservable directions from the estimator.

Figure 13:
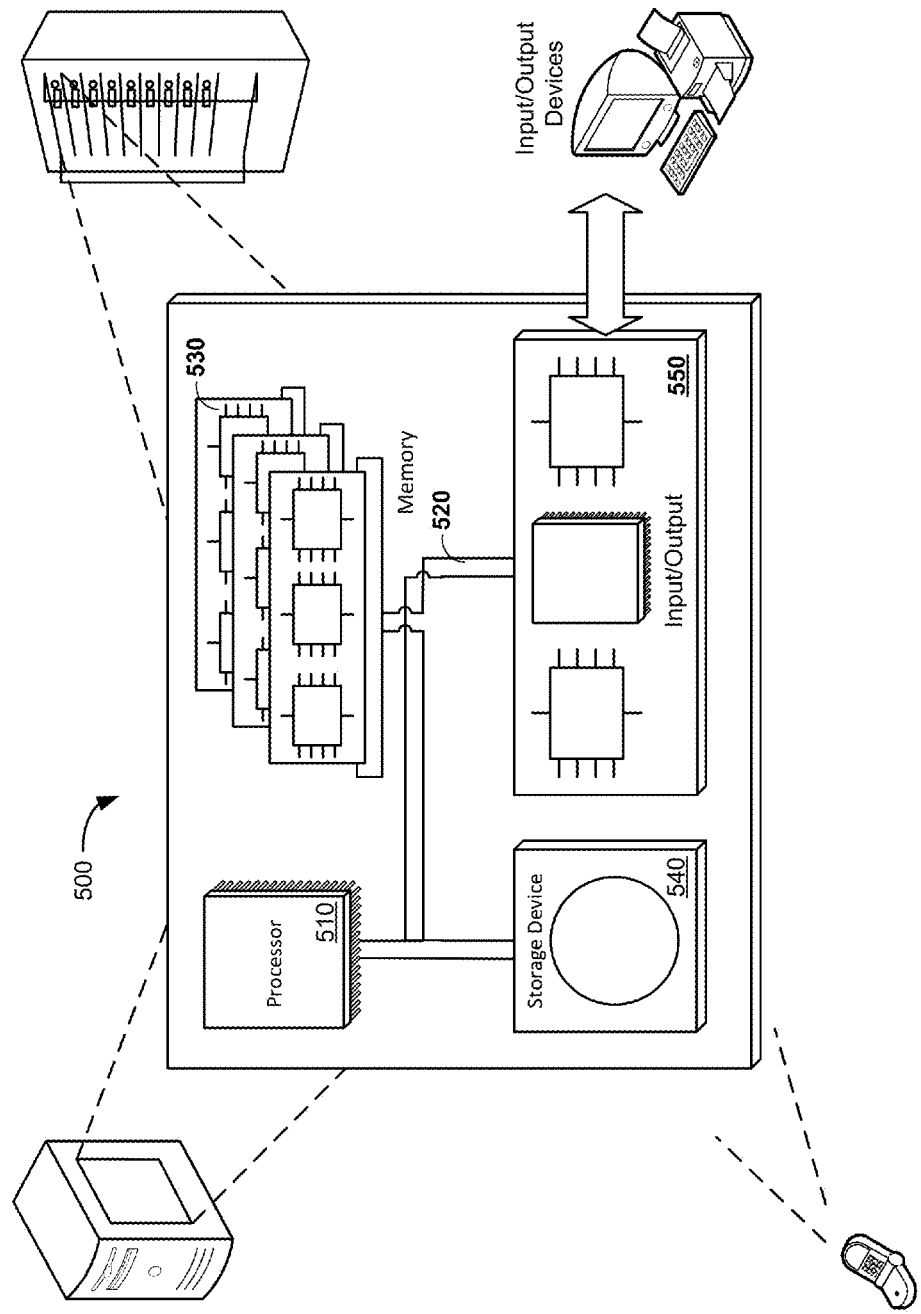
FIG. 13 shows a detailed example of various devices that may be configured to implement various embodiments in accordance with the current disclosure.

FIG. 13 shows a detailed example of various devices that may be configured to implement some embodiments in accordance with the current disclosure. For example, device 500 may be a mobile sensing platform, a mobile phone, a workstation, a computing center, a cluster of servers or other example embodiments of a computing environment, centrally located or distributed, capable of executing the techniques described herein. Any or all of the devices may, for example, implement portions of the techniques described herein for vision-aided inertial navigation system.

In this example, a computer 500 includes a processor 510 that is operable to execute program instructions or software, causing the computer to perform various methods or tasks, such as performing the enhanced estimation techniques described herein. Processor 510 is coupled via bus 520 to a memory 530, which is used to store information such as program instructions and other data while the computer is in operation. A storage device 540, such as a hard disk drive, nonvolatile memory, or other non-transient storage device stores information such as program instructions, data files of the multidimensional data and the reduced data set, and other information. The computer also includes various input-output elements 550, including parallel or serial ports, USB, Firewire or IEEE 1394, Ethernet, and other such ports to connect the computer to external device such a printer, video camera, surveillance equipment or the like. Other input-output elements include wireless communication interfaces such as Bluetooth, Wi-Fi, and cellular data networks.

The computer itself may be a traditional personal computer, a rack-mount or business computer or server, or any other type of computerized system. The computer in a further example may include fewer than all elements listed above, such as a thin client or mobile device having only some of the shown elements. In another example, the computer is distributed among multiple computer systems, such as a distributed server that has many computers working together to provide various functions.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer readable data storage medium comprising instructions that, when executed, cause one or more processors to perform one or more of the methods described above. For example, the computer-readable data storage medium or device may store such instructions for execution by a processor. Any combination of one or more computer-readable medium(s) may be utilized.

A computer-readable storage medium (device) may form part of a computer program product, which may include packaging materials. A computer-readable storage medium (device) may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other processing circuitry suitable for implementation of the techniques described herein. In addition, in some aspects, functionality described in this disclosure may be provided within software modules or hardware modules.

This disclosure analyzed the inconsistency of VINS from the standpoint of observability. For example, it was showed that standard EKF-based filtering approaches lead to spurious information gain since they do not adhere to the unobservable directions of the true system. Furthermore, an observability-constrained VINS approach was applied to mitigate estimator inconsistency by enforcing the nullspace explicitly. An extensive simulation and experimental results were presented to support and validate the described estimator, by applying it to both V-SLAM and the MSC-KF.

Various embodiments of the invention have been described. These and other embodiments are within the scope of the following claims.

The invention claimed is:

1. A vision-aided inertial navigation system comprising:
   at least one image source to produce image data for an environment;
   an inertial measurement unit (IMU) to produce IMU data indicative of motion of the vision-aided inertial navigation system; and
   a hardware-based processor configured to execute an estimator that computes state estimates for the vision-aided inertial navigation system based on the image data and the IMU data,
   wherein the estimator applies a constrained estimation algorithm that computes the state estimates based on the IMU data and the image data while preventing projection of information from the image data and IMU data along at least one unobservable degrees of freedom for the vision-aided inertial navigation system.

2. The vision-aided inertial navigation system of claim 1, wherein the unobservable degrees of freedom comprise translations in horizontal and vertical directions and a rotation about a gravity vector, and
   wherein the estimator applies the constrained estimation algorithm to the image data and the IMU data to compute the state estimates by projecting the information from the image data and IMU data for at least the translations in horizontal and vertical directions while preventing projection of information from the image data and IMU data along the gravity vector.

3. The vision-aided inertial navigation system of claim 1, wherein the processing unit computes a map of an area traversed by the vision-aided inertial navigation system based at least in part on the state estimates.

4. The vision-aided inertial navigation system of claim 1, wherein the processing unit computes an odometry traversed by the vision-aided inertial navigation system based at least in part on the state estimates.

5. The vision-aided inertial navigation system of claim 1, wherein the processing unit computes the state estimates for at least one of a pose of the vision-aided inertial navigation system, a velocity of the vision-aided inertial navigation system, a displacement of the vision-aided inertial navigation system and 3D positions of visual landmarks observed by the Image source.

6. The vision-aided inertial navigation system of claim 1, wherein the estimator applies an Extended Kalman Filter (EKF) to compute the state estimates.

7. The vision-aided inertial navigation system of claim 1, wherein the estimator enforces a nullspace associated with the at least one of the unobservable degrees of freedom when propagating current position and orientation information to the estimated states for the unobservable degrees of freedom.

8. The vision-aided inertial navigation system of claim 1, wherein the processing unit applies visual simultaneous localization and mapping (V-SLAM) to compute orientation and position of features observed by the image source.

9. The vision-aided inertial navigation system of claim 1, wherein the processing unit applies a Multi-state Constraint Kalman Filter (MSC-KF) to compute visual-inertial odometry.

10. The vision-aided inertial navigation system of claim 1, wherein the estimator executes within a device that houses the image source and the IMU unit.

11. The vision-aided inertial navigation system of claim 1, wherein the estimator executes on a processor remote from the image source and the IMU unit.

12. The vision-aided inertial navigation system of claim 1, wherein the estimator computes the state estimates for the vision-aided inertial navigation system based on the IMU data and features extracted from the image data,
    wherein the features comprise points, lines, planes or geometric shapes based on combinations thereof.

13. The vision-aided inertial navigation system of claim 1, wherein the vision-aided inertial navigation system comprises a mobile computing device.

14. The vision-aided inertial navigation system of claim 1, wherein the image source comprises one or more of a cameras that capture 2D or 3D images, a laser scanner that produces a stream of 1D image data, a depth sensor that produces image data indicative of ranges for features within an environment, and a stereo vision system having multiple cameras to produce 3D information.

15. A method comprising:
receiving image data captured by an image source of a sensing device;
receiving, from an inertial measurement unit (IMU) of the sensing device, inertial measurement data indicative of motion of the sensing device; and
computing state estimates for the sensing device based on the image data captured by the image source and the inertial measurement data indicative of the motion of the sensing device,
wherein computing the state estimates comprises applying a constrained estimation algorithm to prevent projection of information from the image data and IMU data along at least one of the unobservable degrees of freedom of the sensing device.

16. The method of claim 15,
wherein the unobservable degrees of freedom of the sensing device comprise translations in horizontal and vertical directions and a rotation about a gravity vector, and
wherein the computing state estimates comprises applying the constrained estimation algorithm to correct the state estimates for translations of the sensing device in horizontal and vertical directions based on the inertial measurement data and the image data and prevent projection of information from the image data and IMU data for a rotation of the sensing device about the gravity vector.

17. The method of claim 15, further comprising computing a map of an area traversed by the sensing device based at least in part on the state estimates.

18. The method of claim 15, further comprising computing at least one of a pose of the sensing device, a velocity of the sensing device, a displacement of the sensing device and 3D positions of visual landmarks based at least in part on the state estimates for the subset of the unobservable degrees of freedom without utilizing state estimates of the at least one of the unobservable degrees of freedom.

19. The method of claim 15,
wherein computing state estimates comprises computing the state estimates for the vision-aided inertial navigation system based on the IMU data and features extracted from the image data,
wherein the features comprise points, lines, planes or geometric shapes based on combinations thereof.

20. A non-transitory computer-readable storage medium comprising program code that causes a processor of a computing device to:
receive image data captured by an image source of a sensing device;
receive, from an inertial measurement unit (IMU) of the sensing device, inertial measurement data indicative of motion of the sensing device; and
compute state estimates the sensing device based on the image data captured by the image source and the inertial measurement data indicative of the motion of the sensing device,
wherein computing the state estimates comprises applying a constrained estimation algorithm to compute the state estimates based on the IMU data and the image data while preventing projection of information from the image data and IMU data along at least one unobservable degrees of freedom for the sensing device.

21. The vision-aided inertial navigation system of claim 1,
wherein the estimator is configured to maintain a state vector that includes the state estimates for a position and orientation with respect to six degrees of freedom of the vision-aided inertial navigation system, and
wherein, when processing the IMU data and image data to update the state estimates in the state vector, the estimator prevents update of the state estimates along at least one unobservable degrees of freedom for the sensing device.

22. The method of claim 15, further comprising:
maintaining, with the sensing device, a state vector that includes the state estimates for a position and orientation with respect to six degrees of freedom of the sensing device, and
processing the image data and the IMU data with the sensing device to update the state estimates with the state vector with respect to the six degrees of freedom; and
when processing the image data and IMU data, preventing update of the state estimates within the state vector along at least one unobservable degrees of freedom for the sensing device.

* * * * *